United States Patent
DeKoning et al.

(10) Patent No.: US 6,457,098 B1
(45) Date of Patent: *Sep. 24, 2002

(54) METHODS AND APPARATUS FOR COORDINATING SHARED MULTIPLE RAID CONTROLLER ACCESS TO COMMON STORAGE DEVICES

(75) Inventors: Rodney A. DeKoning; Gerald J. Fredin, both of Wichita, KS (US)

(73) Assignee: LSI Logic Corporation, Milpitas, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/499,926

(22) Filed: Feb. 8, 2000

Related U.S. Application Data

(63) Continuation of application No. 08/772,614, filed on Dec. 23, 1998, now Pat. No. 6,073,218.

(51) Int. Cl.[7] ............................................. G06F 12/02
(52) U.S. Cl. ...................... 711/114; 711/150; 711/152; 714/6
(58) Field of Search ................................ 711/114, 152, 711/150; 714/6

(56) References Cited

U.S. PATENT DOCUMENTS

| | | | | |
|---|---|---|---|---|
| 5,379,417 A | * | 1/1995 | Lui et al. | 706/916 |
| 5,546,535 A | * | 8/1996 | Stallmo et al. | 714/42 |
| 5,666,511 A | * | 9/1997 | Suganuma et al. | 711/114 |

* cited by examiner

Primary Examiner—Hiep T. Nguyen
(74) Attorney, Agent, or Firm—Lathrop & Gage

(57) ABSTRACT

Methods and associated apparatus for performing concurrent I/O operations on a common shared subset of disk drives (LUNs) by a plurality of RAID controllers. The methods of the present invention are operable in all of a plurality of RAID controllers to coordinate concurrent access to a shared set of disk drives. The plurality of RAID controllers operable enhance the performance of a RAID subsystem by better utilizing available processing power among the plurality of RAID controllers. Each of a plurality of RAID controllers may actively process different I/O requests on a common shared subset of disk drives. One of the plurality of controllers is designated as primary with respect to a particular shared subset of disk drives. The plurality of RAID controllers then exchange messages over a communication medium to coordinate concurrent access to the shared subset of disk drives through the primary controller.

11 Claims, 11 Drawing Sheets

METHODS AND APPARATUS FOR COORDINATING SHARED MULTIPLE RAID CONTROLLER ACCESS TO COMMON STORAGE DEVICES

RELATED PATENTS

The present invention is a continuation of co-pending, commonly assigned U.S. patent aplication Ser. No. 08/772,614, now U.S. Pat. No. 6,073,218, filed Dec. 23, 1998 which is hereby incorporated by reference.

BACKGROUND OF THE INVENTION

1. Field of the Invention.

The present invention relates to storage subsystems and in particular to methods and associated apparatus which provide shared access to common storage devices within the storage subsystem by multiple storage controllers.

2. Discussion of Related Art

Modern mass storage subsystems are continuing to provide increasing storage capacities to fulfill user demands from host computer system applications. Due to this critical reliance on large capacity mass storage, demands for enhanced reliability are also high. Various storage device configurations and geometries are commonly applied to meet the demands for higher storage capacity while maintaining or enhancing reliability of the mass storage subsystems.

One solution to these mass storage demands for increased capacity and reliability is the use of multiple smaller storage modules configured in geometries that permit redundancy of stored data to assure data integrity in case of various failures. In many such redundant subsystems, recovery from many common failures can be automated within the storage subsystem itself due to the use of data redundancy, error correction codes, and so-called "hot spares" (extra storage modules which may be activated to replace a failed, previously active storage module). These subsystems are typically referred to as redundant arrays of inexpensive (or independent) disks (or more commonly by the acronym RAID). The 1987 publication by David A. Patterson, et al., from University of California at Berkeley entitled *A Case for Redundant Arrays of Inexpensive Disks* (RAID), reviews the fundamental concepts of RAID technology.

There are five "levels" of standard geometries defined in the Patterson publication. The simplest array, a RAID level 1 system, comprises one or more disks for storing data and an equal number of additional "mirror" disks for storing copies of the information written to the data disks. The remaining RAID levels, identified as RAID level 2,3,4 and 5 systems, segment the data into portions for storage across several data disks. One of more additional disks are utilized to store error check or parity information.

RAID storage subsystems typically utilize a control module that shields the user or host system from the details of managing the redundant array. The controller makes the subsystem appear to the host computer as a single, highly reliable, high capacity disk drive. In fact, the RAID controller may distribute the host computer system supplied data across a plurality of the small independent drives with redundancy and error checking information so as to improve subsystem reliability. Frequently RAID subsystems provide large cache memory structures to further improve the performance of the RAID subsystem. The cache memory is associated with the control module such that the storage blocks on the disk array are mapped to blocks in the cache. This mapping is also transparent to the host system. The host system simply requests blocks of data to be read or written and the RAID controller manipulates the disk array and cache memory as required.

To further improve reliability, it is known in the art to provide redundant control modules to reduce the failure rate of the subsystem due to control electronics failures. In some redundant architectures, pairs of control modules are configured such that they control the same physical array of disk drives. A cache memory module is associated with each of the redundant pair of control modules. The redundant control modules communicate with one another to assure that the cache modules are synchronized. When one of the redundant pair of control modules fails, the other stands ready to assume control to carry on operations on behalf of I/O requests. However, it is common in the art to require host intervention to coordinate failover operations among the controllers.

It is also known that such redundancy methods and structures may be extended to more than two control modules. Theoretically, any number of control modules may participate in the redundant processing to further enhance the reliability of the subsystem.

However, when all redundant control modules are operable, a significant portion of the processing power of the redundant control modules is wasted. One controller, often referred to as a master or the active controller, essentially processes all I/O requests for the RAID subsystem. The other redundant controllers, often referred to as slaves or passive controllers, are simply operable to maintain a consistent mirrored status by communicating with the active controller. As taught in the prior art, for any particular RAID logical unit (LUN—a group of disk drives configured to be managed as a RAID array), there is a single active controller responsible for processing of all I/O requests directed thereto. The passive controllers do not concurrently manipulate data on the same LUN.

It is known in the prior art to permit each passive controller to be deemed the active controller with respect to other LUNs within the RAID subsystem. So long as there is but a single active controller with respect to any particular LUN, the prior art teaches that there may be a plurality of active controllers associated with a RAID subsystem. In other words, the prior art teaches that each active controller of a plurality of controllers is provided with coordinated shared access to a subset of the disk drives. The prior art therefore does not teach or suggest that multiple controllers may be concurrently active processing different I/O requests directed to the same LUN.

In view of the above it is clear that a need exists for an improved RAID control module architecture that permits scaling of RAID subsystem performance through improved connectivity of multiple controllers to shared storage modules. In addition, it is desirable to remove the host dependency for failover coordination. More generally, a need exists for an improved storage controller architecture for improved scalability by shared access to storage devices to thereby enable parallel processing of multiple I/O requests.

SUMMARY OF THE INVENTION

The present invention solves the above and other problems, and thereby advances the useful arts, by providing methods and associated apparatus which permit all of a plurality of storage controllers to share access to common storage devices of a storage subsystem. In particular, the present invention provides for concurrent processing by a plurality of RAID controllers simultaneously processing I/O requests. Methods and associated apparatus of the present invention serve to coordinate the shared access so as to prevent deadlock conditions and interference of one controller with the I/O operations of another controller. Notably, the present invention provides inter-controller communications to obviate the need for host system intervention to coordinate failover operations among the controllers. Rather, a plurality of controllers share access to common storage modules and communicate among themselves to permit continued operations in case of failures.

As presented herein the invention is discussed primarily in terms of RAID controllers sharing access to a logical unit (LUN) in the disk array of a RAID subsystem. One of ordinary skill will recognize that the methods and associated apparatus of the present invention are equally applicable to a cluster of controllers commonly attached to shared storage devices. In other words, RAID control management techniques are not required for application of the present invention. Rather, RAID subsystems are a common environment in which the present invention may be advantageously applied. Therefore, as used herein, a LUN (a RAID logical unit) is to be interpreted as equivalent to a plurality of storage devices or a portion of a one or more storage devices. Likewise, RAID controller or RAID control module is to be interpreted as equivalent to a storage controller or storage control module. For simplicity of this presentation, RAID terminology will be primarily utilized to describe the invention but should not be construed to limit application of the present invention only to storage subsystems employing RAID techniques.

More specifically, the methods of the present invention utilize communication between a plurality of RAID controlling elements (controllers) all attached to a common region on a set of disk drives (a LUN) in the RAID subsystem. The methods of the present invention transfer messages among the plurality of RAID controllers to coordinate concurrent, shared access to common subsets of disk drives in the RAID subsystem. The messages exchanged between the plurality of RAID controllers include access coordination messages such as stripe lock semaphore information to coordinate shared access to a particular stripe of a particular LUN of the RAID subsystem. In addition, the messages exchanged between the plurality of controllers include cache coherency messages such as cache data and cache meta-data to assure consistency (coherency) between the caches of each of the plurality of controllers.

In particular, one of the plurality of RAID controllers is designated as the primary controller with respect to each of the LUNs (disk drive subsets) of the RAID subsystem. The primary controller is responsible for fairly sharing access to the common disk drives of the LUN among all requesting RAID controllers. A controller desiring access to the shared disk drives of the LUN sends a message to the primary controller requesting an exclusive temporary lock of the relevant stripes of the LUN. The primary controller returns a grant of the requested lock in due course when such exclusivity is permissible. The requesting controller then performs any required I/O operations on the shared devices and transmits a lock release to the primary controller when the operations have completed. The primary controller manages the lock requests and releases using a pool of semaphores for all controllers accessing the shared LUNs in the subsystem. One of ordinary skill in the art will readily recognize that the primary/secondary architecture described above may be equivalently implemented in a peer-to-peer or broadcast architecture.

As used herein, exclusive, or temporary exclusive access, refers to access by one controller which excludes incompatible access by other controllers. One of ordinary skill will recognize that the degree of exclusivity among controllers depends upon the type of access required. For example, exclusive read/write access by one controller may preclude all other controller activity, exclusive write access by one controller may permit read access by other controllers, and similarly, exclusive append access by one controller may permit read and write access to other controllers for unaffected portions of the shared storage area. It is therefore to be understood that the terms "exclusive" and "temporary exclusive access" refer to all such configurations. Such exclusivity is also referred to herein as "coordinated shared access."

Since most RAID controllers rely heavily on cache memory subsystems to improve performance, cache data and cache meta-data is also exchanged among the plurality of controllers to assure coherency of the caches on the plurality of controllers which share access to the common LUN. Each controller which updates its cache memory in response to processing an I/O request (or other management related I/O operation) exchanges cache coherency messages to that effect with a designated primary controller for the associated LUN. The primary controller, as noted above, carries the primary burden of coordinating activity relating to the associated LUN. In addition to the exclusive access lock structures and methods noted above, the primary controller also serve as the distributed cache manager (DCM) to coordinate the state of cache memories among all controllers which manipulate data on the associated LUN.

In particular, a secondary controller (non-primary with respect to a particular LUN) wishing to update its cache data in response to an I/O request must first request permission of the primary controller (the DCM for the associated LUN) for the intended update. The primary controller then invalidates any other copies of the same cache data (now obsolete) within any other cache memory of the plurality of controllers. Once all other copies of the cache data are invalidated, the primary controller grants permission to the secondary controller which requested the update. The secondary controller may then complete the associated I/O request and update the cache as required. The primary controller (the DCM) thereby maintains data structures which map the contents of all cache memories in the plurality of controllers which contain cache data relating to the associated LUN.

The semaphore lock request and release information and the cache data and meta-data are exchanged between the plurality of shared controllers through any of several communication mediums. A dedicated communication bus interconnecting all RAID controllers may be preferred for performance criteria, but may present cost and complexity problems. Another preferred approach is where the information is exchanged via the communication bus which connects the plurality of controllers to the common subset of disk drives in the common LUN. This communication bus may be any of several industry standard connections, including, for example, SCSI, Fibre Channel, IPI, SSA, PCI, etc. Similarly the host connection bus which connects the plurality of RAID controllers to one or more host computer systems may be utilized as the shared communication medium. In addition, the communication medium may be a shared memory architecture in which the a plurality of controllers share access to a common, multiported memory subsystem (such as the cache memory subsystem of each controller).

As used herein, controller (or RAID controller, or control module) includes any device which applies RAID techniques to an attached array of storage devices (disk drives). Examples of such controllers are RAID controllers embedded within a RAID storage subsystem, RAID controllers embedded within an attached host computer system, RAID control techniques constructed as software components within a computer system, etc. The methods of the present invention are similarly applicable to all such controller architectures.

Another aspect of the present invention is the capability to achieve N-way connectivity wherein any number of controllers may share access to any number of LUNs within a RAID storage subsystem. A RAID storage subsystem may include any number of control modules. When operated in accordance with the present invention to provide temporary exclusive access to LUNs within commonly attached storage devices such a RAID subsystem provides redundant paths to all data stored within the subsystem. These redundant paths serve to enhance reliability of the subsystem while, in accordance with the present invention, enhancing performance of the subsystem by performing multiple operation concurrently on common shared LUNs within the storage subsystem.

The configuration flexibility enabled by the present invention permits a storage subsystem to be configured for any control module to access any data within the subsystem, potentially in parallel with other access to the same data by another control module. Whereas the prior art generally utilized two controllers only for purposes of paired redundancy, the present invention permits the addition of controllers for added performance as well as added redundancy. Cache mirroring techniques of the present invention are easily extended to permit (but not require) any number of mirrored cached controllers. By allowing any number of interfaces (i.e., FC-AL loops) on each controller, various sharing geometries may be achieved in which certain storage devices are shared by one subset of controller but not another. Virtually any mixture of connections may be achieved in RAID architectures under the methods of the present invention which permit any number of controllers to share access to any number of common shared LUNs within the storage devices.

Furthermore, each particular connection of a controller or group of controllers to a particular LUN or group of LUNs may be configured for a different level of access (i.e., read-only, read-write, append only, etc.). Any controller within a group of commonly connected controllers may configure the geometry of all controllers and LUNs in the storage, subsystem and communicate the resultant configuration to all controllers of the subsystem. In a preferred embodiment of the present invention, a master controller is designated and is responsible for all configuration of the subsystem geometry.

The present invention therefore improves the scalability of a RAID storage subsystem such that control modules can be easily added and configured for parallel access to common shared LUNs. Likewise, additional storage devices can be added and utilized by any subset of the controllers attached thereto within the RAID storage subsystem. A RAID subsystem operable in accordance with the present invention therefore enhances the scalability of the subsystem to improve performance and/or redundancy through the N-way connectivity of controllers and storage devices.

It is therefore an object of the present invention to provide methods and associated apparatus for concurrent processing of I/O requests by RAID controllers on a shared LUN.

It is a further object of the present invention to provide methods and associated apparatus for concurrent access by a plurality of RAID controllers to a common LUN.

It is still a further object of the present invention to provide methods and associated apparatus for coordinating shared access by a plurality of RAID controllers to a common LUN.

It is yet another object of the present invention to provide methods and associated apparatus for managing semaphores to coordinate shared access by a plurality of RAID controllers to a common LUN.

It is still another object of the present invention to provide methods and associated apparatus for managing cache data to coordinate shared access by a plurality of RAID controllers to a common LUN.

It is further an object of the present invention to provide methods and associated apparatus for managing cache metadata to coordinate shared access by a plurality of RAID controllers to a common LUN.

It is still further an object of the present invention to provide methods and associated apparatus for exchanging messages via a communication medium between a plurality of RAID controllers to coordinate shared access by a plurality of RAID controllers to a common LUN.

It is another object of the present invention to provide methods and associated apparatus which enable N-way redundant connectivity within the RAID storage subsystem.

It is still another object of the present invention to provide methods and associated apparatus which. improve scalability of a RAID storage subsystem for performance.

The above and other objects, aspects, features, and advantages of the present invention will become apparent from the following description and the attached drawing.

DETAILED DESCRIPTION OF THE PREFERRED EMBODIMENT

Figure 1:
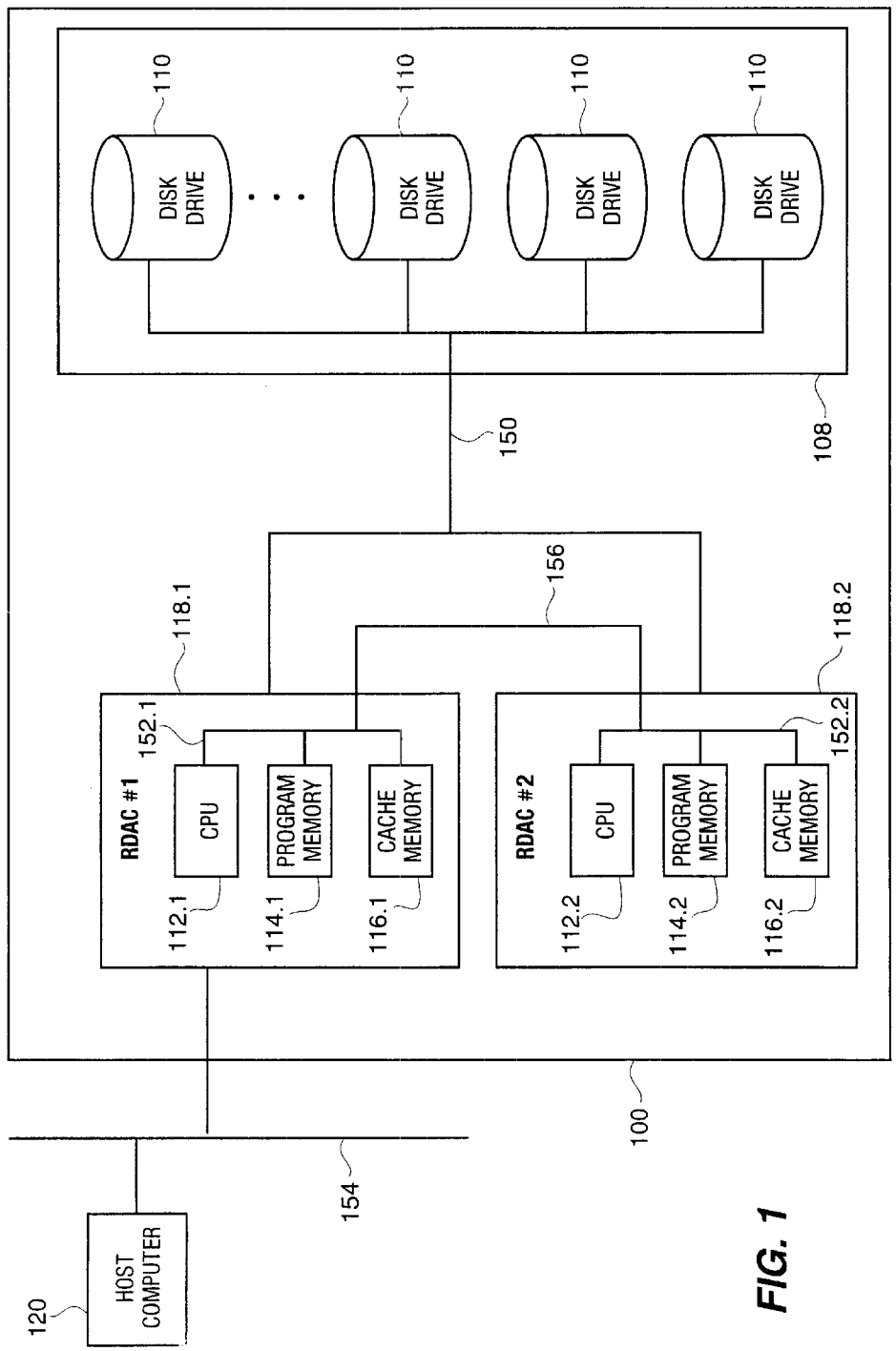
FIG. 1 is a block diagram of a typical RAID storage subsystem in which the structures and methods of the present invention may be applied.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

Raid Subsystem Overview

FIG. 1 is a block diagram of a typical RAID storage subsystem 100, having redundant disk array controllers 118.1 and 118.2 (hereinafter synonymously referred to as RDACs, RAID control modules, or control modules), in which the methods and associated apparatus of the present invention may be applied. RAID storage subsystem 100 includes at least two RDACs 118.1 and 118.2. Each RDAC 118.1 and 118.2 is in turn connected to disk array 108 and to one another via bus (or busses) 150 and to host computer 120 via bus 154. Disk array 108 is comprised of a plurality of disk drives 110 (also referred to herein as storage devices). One of ordinary skill in the art will readily recognize that interface bus 150 between RDACs 118.1 and 118.2 and disk array 108 (including disk drives 110) may be any of several industry standard interface busses including SCSI, IDE, EIDE, IPI, Fibre Channel, SSA, PCI, etc. Circuits (not shown) within RDACs 118.1 and 118.2 appropriate to controlling bus 150 are well known to those of ordinary skill in the art. Interface bus 154 between RDACs 118.1 and 118.2 and host computer 120 may be any of several standard industry interface busses including Fibre Channel, FDDI, SSA, SCSI, Ethernet (LAN), Token Ring (LAN), etc. Circuits (not shown) within RDACs 118.1 and 118.2 appropriate to controlling bus 154 are well known to those of ordinary skill in the art.

As shown in FIG. 1, RAID storage subsystem 100 may be utilized to implement any of the well known RAID levels (e.g. levels 0–6). The various RAID levels are distinguished by the manner in which the associated RAID controller logically subdivides or partitions the disk drives 110 in disk array 108 and by the manner in which data is placed on the disk drives 110. For example, when implementing RAID level 1 features, approximately half of the disk drives 110 of disk array 108 are used to store and retrieve data while the other half is operated by the RAID controller to mirror the data storage contents of the first half. Further, when implementing RAID level 4 features, the RAID controller utilizes a portion of the disk drives 110 in disk array 108 for the storage of data and the remaining disk drives 110 are utilized for the storage of error checking/correcting information (e.g. parity information). As discussed below, the methods and associated apparatus of the present invention may be applied to the RAID storage subsystem 100 in conjunction with any of the standard RAID levels.

RDAC 118.1 includes CPU 112.1, program memory 114.1 (e.g. ROM/RAM devices for storing program instructions and variables for the operation of CPU 112.1), and cache memory 116.1 for storing data and control information related to the data stored in disk array 108. CPU 112.1, program memory 114.1, and cache memory 116.1 are connected via memory bus 152.1 to enable CPU 112.1 to store and retrieve information in the memory devices. RDAC 118.2 is identical to RDAC 118.1 and is comprised of CPU 112.2, program memory 114.2 and cache memory 116.2, all interconnected via memory bus 152.2.

To permit each RDAC to communicate with the other, the RDACs 118.1 and 118.2 are interconnected via shared bus 156. The RDACs 118.1 and 118.2 are interchangeable devices within RAID subsystem 100 to permit easy replacement, including hot swap, of a defective RDAC. One of ordinary skill in the art will readily recognize that the block diagram of FIG. 1 is intended only as an exemplary design which may embody the present invention. Many alternate controller and subsystem designs may embody the methods and associated apparatus and structures of the present invention. For example, the RDACs 118.1 and 118.2 may communicate via shared bus 156 or other communication media such as the bus 150 used to connect the storage devices to the array controllers 118.1 and 118.2 or bus 154 used to connect the RDACs to the host computer system 120. Specifically, several of the standard interface busses usable for bus 150 such as SCSI or Fibre Channel may be readily applied to communication between the RDACs as well as to communication between an RDAC and the disk array 108. In addition, one of ordinary skill in the art will readily recognize that the methods of the present invention are operable in a plurality of control modules connected to a common LUN regardless of the presence or absence of redundancy techniques implemented within the control modules.

FIG. 1 depicts a pair of control modules 118.1 and 118.2 commonly connected via bus 150 to a single disk array 108 comprised of a plurality of disk drives 110. One of ordinary skill in the art will readily recognize that disk array 108 is a logical grouping of a plurality of disk drives 110 managed in accordance with the RAID management techniques. Such a grouping is often referred to as a logical unit or LUN. It is common that a single RAID subsystem 100 may have several LUNs configured within under control of the controller (or RDACs 118.1 and 118.2). FIG. 1 is therefore merely suggestive of one RAID environment in which the methods of the present invention may be advantageously applied.

Common Access to Shared Devices

As shown in FIG. 1, a pair of redundant RAID control modules (118.1 and 118.2) are operable to assure highly reliable control of the RAID subsystem 100. One of the two RDACs is deemed the active controller in such a redundant architecture while the other RDAC is referred to as passive. More generally, any number of passive RDACs may be added to such an architecture to enhance reliability. The active RDAC is responsible for processing of I/O requests received from an attached host computer 120. The cache memory 116.1 and 116.2 is accessible by both CPU 112.1 and 112.2 via shared bus 156 and thus maintained in a consistent (coherent) fashion. The passive RDAC(s) 118.2 may therefore assume the role of active RDAC in case of failure of the originally active RDAC 118.1. Use of redundant control modules for such reliability enhancement is well known in the art.

As known in the art, there is but a single active controller with respect to a particular LUN. There may be one or more passive controllers available to assume control from the active controller in case of failure of the active controller. The passive RDAC(s) is (are) generally idle awaiting a failure of the active RDAC with respect to the particular LUN. A passive RDAC may be in the role of an active RDAC with respect to other particular LUNs. A passive RDAC then assumes the role of active RDAC to avoid loss of data availability due to RDAC failure.

The present invention provides methods to utilize otherwise idle processing power of the additional (previously passive) control modules to process additional (multiple) host generated I/O requests in parallel for a particular LUN. Under the methods and structure of the present invention, there may be any number of active controllers with respect to any particular LUN. There may also be any number of additional passive controllers with respect to a particular LUN serving as redundant backups in case of failure of one of the active controllers. The present invention may therefore be said to permit N-way redundancy for control of any particular LUN of the storage subsystem.

As noted above, a plurality of active controllers may be processing I/O requests for a particular shared LUN in parallel. This parallel processing of multiple I/O requests directed to a common shared LUN (drive array 108) dramatically enhances the total I/O throughput to the RAID subsystem. In order for two (or more) control modules to concurrently access the same common shared LUN (disk array 108), the methods of the present invention coordinate the concurrent usage to assure that the parallel processing by one control module does not interfere with the processing of another control module.

For example, when a RAID controller performs a read-modify-write (RMW) cycle (to update data in a stripe of a RAID disk array), the operation must be completed as an atomic operation so as to prevent other control modules from reading or writing other data in the same stripe while the RMW operation proceeds. The methods of the present invention utilize semaphore constructs to coordinate this temporary mutually exclusive access to the disk drives 108. When one RAID control module desires temporary exclusive access to the disk array (or a portion thereof), exclusive access is requested by locking a semaphore shared between the cooperating plurality of RAID control modules. If the semaphore is successfully locked, the requesting control module may proceed with knowledge that all other cooperating control modules will await release of the semaphore. Until the semaphore is successfully locked, the requesting control module is suspended with respect to its processing of an I/O request for the locked portion until the semaphore is release by another control module with temporary exclusive access.

One of the plurality of control modules is designated as primary with respect to a particular shared LUN. This primary control module manages the semaphore(s) associated with the particular shared LUN (disk array 108). Access coordination messages are exchanged between the primary control module and the other cooperating control modules to request, grant, and release temporary exclusive access to the common shared LUN.

The primary control module manages a plurality of semaphores for a particular common shared LUN (disk array 108). Each semaphore may be dynamically assigned by the primary control module to a particular portion of the common LUN. The requesting control modules identify, with each request, the portion of the common LUN for which they require temporary exclusive access. The primary control module determines if any other locked semaphore is presently assigned to a portion of the common shared LUN which overlaps the newly requested lock. If not, then a new semaphore is assigned to the identified portion and the lock request is returned successfully to the requesting control module. If any other locked semaphore provide temporary exclusive access to an overlapping portion, then the newly requested lock is deferred until such a time as it may be granted. When the requesting control module complete processing on the locked portion, it informs the primary control module of such which, in turn, releases the locked semaphore to be assigned to another portion of the common shared LUN.

In the preferred embodiment, the requesting control modules identify one or more RAID stripes in the common shared LUN in the lock request. The primary control module therefore manages a pool of semaphores which are dynamically assigned to particular stripes of the common shared LUN.

Figure 2:
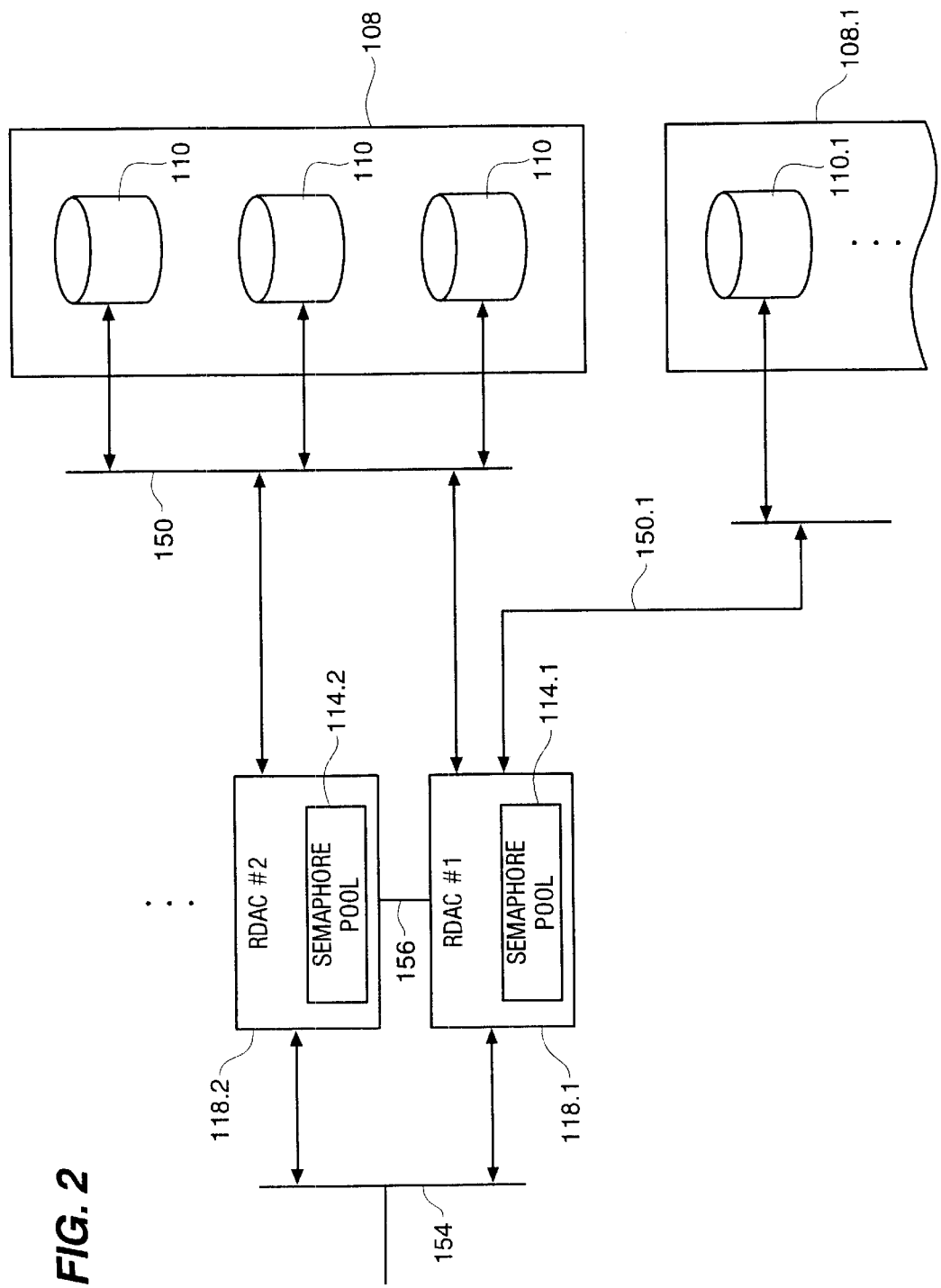
FIG. 2 is a block diagram depicting a first preferred embodiment of RAID controllers operable in accordance with the methods of the present invention in which the controllers communicate via a shared memory bus or via the common disk interface channel.

FIG. 2 depicts a first preferred embodiment operable in accordance with the methods of the present invention. As shown in FIG. 2, a pair of redundant control modules (RDACs 118.1 and 118.2) are connected to a common shared LUN (disk array 108). For purposes of the following discussion, it is presumed that RDAC 118.1 is designated the primary controller for the common shared LUN (disk array 108). RDAC 118.1 is therefore responsible for managing its own access to the LUN (disk array 108) as well as the common access by other RDACs (e.g., 118.2). One of ordinary skill in the art will readily recognize that although two controllers are depicted in FIG. 2 as sharing access to common shared LUN (disk array 108), any number of control modules may share such common access. In addition, each control module may be connected to a plurality disk arrays (LUNs). For example, RDAC 118.1 of FIG. 2 is shown to be connected to two disk arrays, namely 108 and 108.1. A controller may be designated as the primary controller for any number of disk arrays (LUNs) connected thereto or for none of the connected disk arrays.

As shown in FIG. 2, the control modules 118.1 and 118.2 are connected to disk array 108 via common bus 150. As noted above, bus 150 may be a SCSI bus, for example, which permits bidirectional exchange of information between any two devices attached to the bus. Typically, a control module 118.1 or 118.2 would initiate information exchange with a selected one or more of the disk drives 110 in disk array 108 over SCSI bus 150. However, the RDAC 118.1 may also initiate data exchange with RDAC 118.2 and vice versa. The exchange of information between the control modules commonly attached to a shared LUN is used to perform the methods of the present invention. In particular, as noted above, access coordination messages are exchanged between the primary control module for a LUN and the other control modules to coordinate temporary exclusive access to the LUN by any of the control modules attached thereto. The particular message exchange methods of the present invention are discussed in additional detail below.

RDACs 118.1 and 118.2 are also connected via dedicated bus 156 to permit shared access to the memory 114.1 and 114.2, respectively, of each RDAC and to the cache memory 116.1 and 116.2, respectively, of each RDAC. This shared memory connection may also be utilized in conjunction with the methods of the present invention to exchange data and access coordination messages for coordinating temporary exclusive access to the common shared LUN. As noted above, host bus 154 or device bus 150 may be utilized for communication between the plurality of controllers.

One of ordinary skill in the art will further recognize that bus 150 may be any of several industry standard bus connections which permit bidirectional exchange of information thereon. Many such media and protocols are well known in the art which provide a means for exchanging information between a control module and the disk drives as well as between control modules commonly attached to the bus 150.

Figure 3:
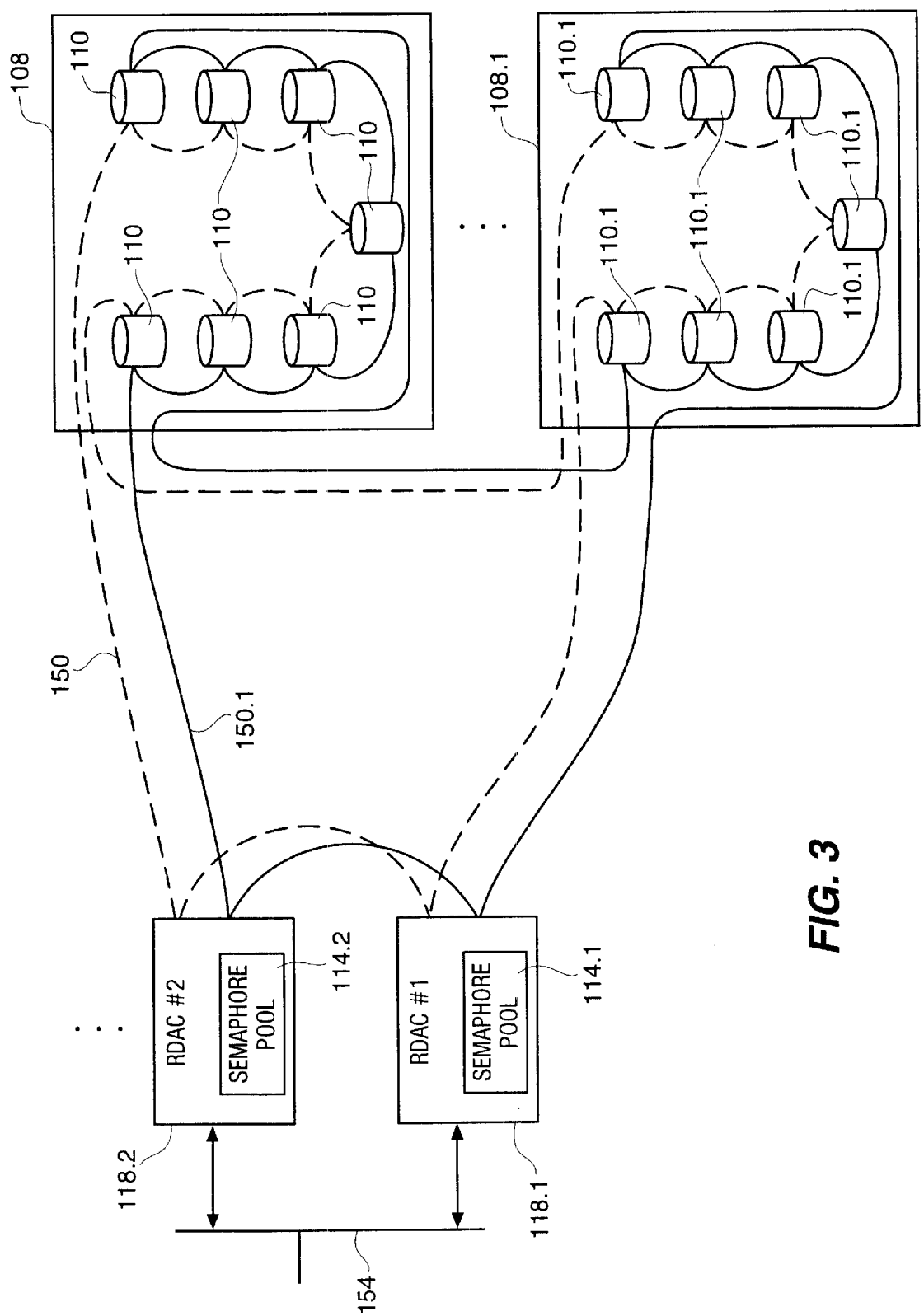
FIG. 3 is a block diagram depicting a second preferred embodiment of RAID controllers operable in accordance with the methods of the present invention in which the controllers communicate via one or more multipoint loop media connecting controllers and disk drives.

FIG. 3 depicts another preferred embodiment on which the methods of the present invention are operable. FIG. 3. depicts a medium which connects a plurality of control modules to a plurality of disk arrays. Specifically, a Fibre Channel Arbitrated Loop (FC-AL) connection provides a high speed communication medium in which any of the nodes on the multipoint loop may exchange information with any other node on the loop. More particularly, the FC-AL medium 150 connects RDACs 118.1 and 118.2 to disk array 108 (a LUN comprising disk drives 108) and to disk array 108.1 (a LUN comprising disk drives 110.1). A second, redundant, FC-AL medium 150.1 connects the same nodes as FC-AL 150 to provide a second, redundant communication path between the nodes. Any of the nodes on either loop 150 or 150.1 may exchange information with any of the other nodes. Such an FC-AL architecture provides for the coordination of temporary exclusive access of a plurality of control modules to a common shared LUN.

One of ordinary skill in the art will readily recognize that practically any number of control modules may be connected in common with any number of disk arrays on each of any number of FC-AL media. The number and variety of topologies in which a plurality of controllers is connected which plurality of disk arrays via which plurality of communication media is essentially infinite. All such configurations and topologies are operable in conjunction with the methods of the present invention to coordinate temporary exclusive access by a plurality of control modules to one or more common shared LUNs.

Exclusive Access Control Structures and Methods

Figure 4:
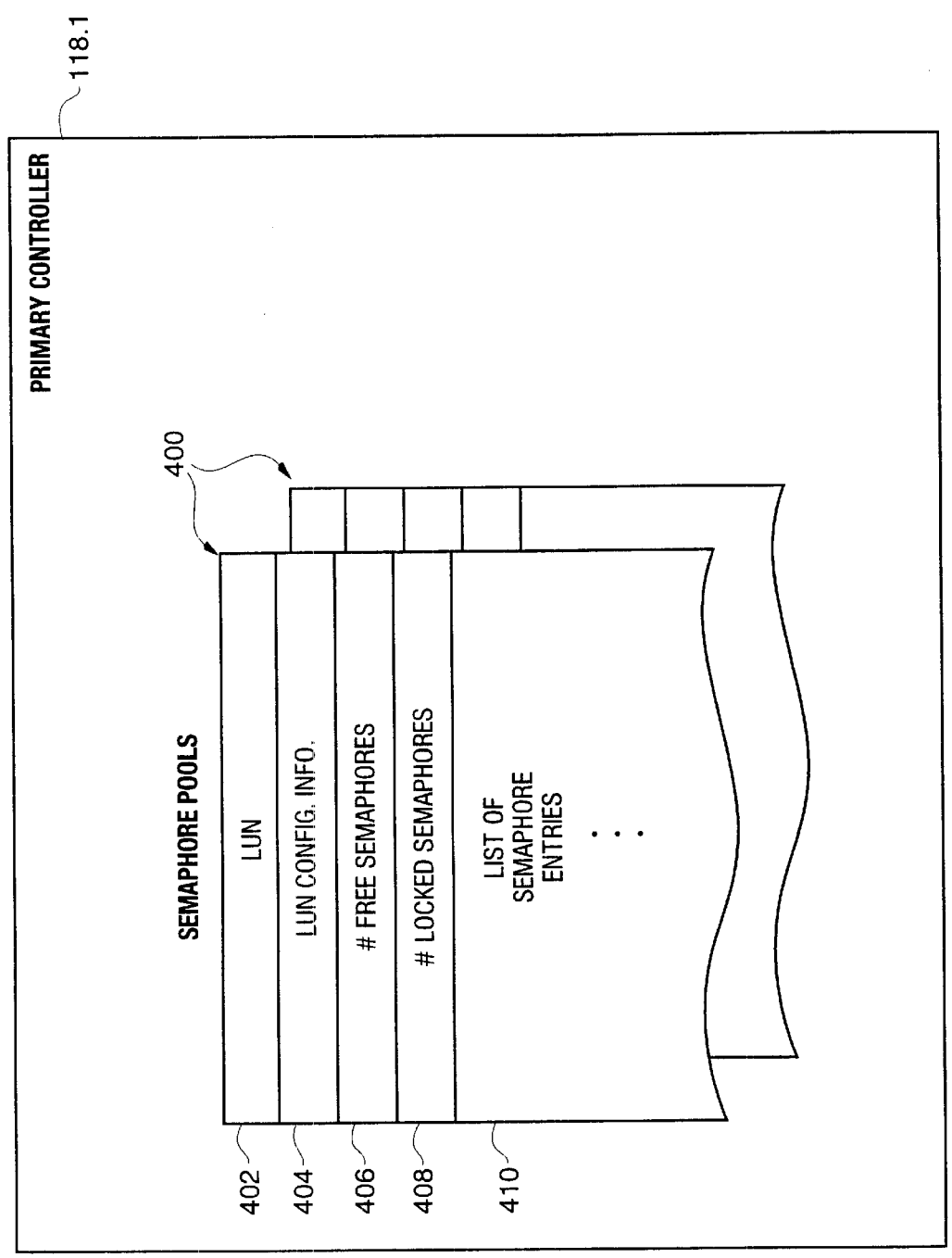
FIG. 4 is a diagram of an exemplary semaphore pool data structure associated with a LUN of the RAID subsystem.

Each control module (RDAC 118.1 or 118.2) which is designated as the primary control module for a particular LUN (disk array 108 or 108.1) is responsible for managing and controlling the granting of temporary exclusive access to any of the control modules which wish to share access to that LUN. FIG. 4 depicts a data structure used by a primary control module to aid in managing the granting of such temporary exclusive access. The primary controller allocates a pool of semaphore tables 400. Since a control module may be designated as the primary control module for a plurality of disk arrays (e.g., 108 and 108.1), a semaphore table 400 may be allocated for each LUN managed by the controller.

Field 402 in each table identifies the LUN (the disk array) to which it corresponds for the management of temporary exclusive access. Relevant configuration information regarding the LUN may be referenced by field 404 of each semaphore table 400. Relevant configuration information may include identification of the particular disk drives 110 which comprise the disk array 108 and information regarding the geometric configuration of the array (e.g., the RAID level and geometry). Other information may include tunable parameters which may affect subsystem performance such as clustering parameters to define minimum and/or maximum quanta of information which may be locked by the plurality of controllers or by any one controller.

Fields 406 and 408 provide counts of the number of semaphores presently free in the semaphore table 400 and the number presently allocated and locked, respectively. These optional fields provide for rapid checking of boundary conditions in the methods of the present invention. Lastly, field 410 is a list of semaphore entries. The list may be implemented in accordance with any standard programming constructs including, for example, linked lists, arrays, or any similar statically or dynamically allocated data structure.

Each semaphore corresponds to a temporary lock over a particular region of the associated LUN by a particular control module. Depending upon the type of RAID geometry in use, a lockable region (portion) of the disk array may comprise a variable number of units and the units may be defined in accordance with various parameters of the RAID geometry. For example, a RAID level 5 LUN may require locking of an entire stripe or a plurality of stripes to assure that stripe writes and partial stripe writes (e.g., read-modify-write operations) do not conflict with one another or with reads of portions of the same stripe. In such a case, a semaphore entry will indicate the stripe or stripes to be locked to assure temporary exclusive access to a required portion of the disk array.

Each semaphore entry in the semaphore list 410 therefore includes information identifying the controller which requested the associated lock and the portion of the corresponding disk array locked by the semaphore. As discussed herein, RAID level 5 geometry will be assumed and therefore a semaphore entry is presumed to identify one or more stripes of a disk array 108. The maximum number of semaphore entries in the semaphore list 410 of a semaphore table 400 depends on the maximum number of regions (portions) that may be simultaneously locked by the plurality of control modules concurrently operating on I/O requests or by implementation specific memory constraints. This number may vary widely in accordance with the particular RAID application. However, the list structure of semaphore list 410 should permit such variable capacity as well as rapid searching. Well known data structures as well as searching and sorting techniques may be applied to maintenance of the semaphore list 410 to permit rapid searching. Speed of maintenance and searching of the semaphore list 410 may be required in RAID applications where the maximum number of simultaneous locks may be large.

Access Coordination Messages and Methods

Figure 5:
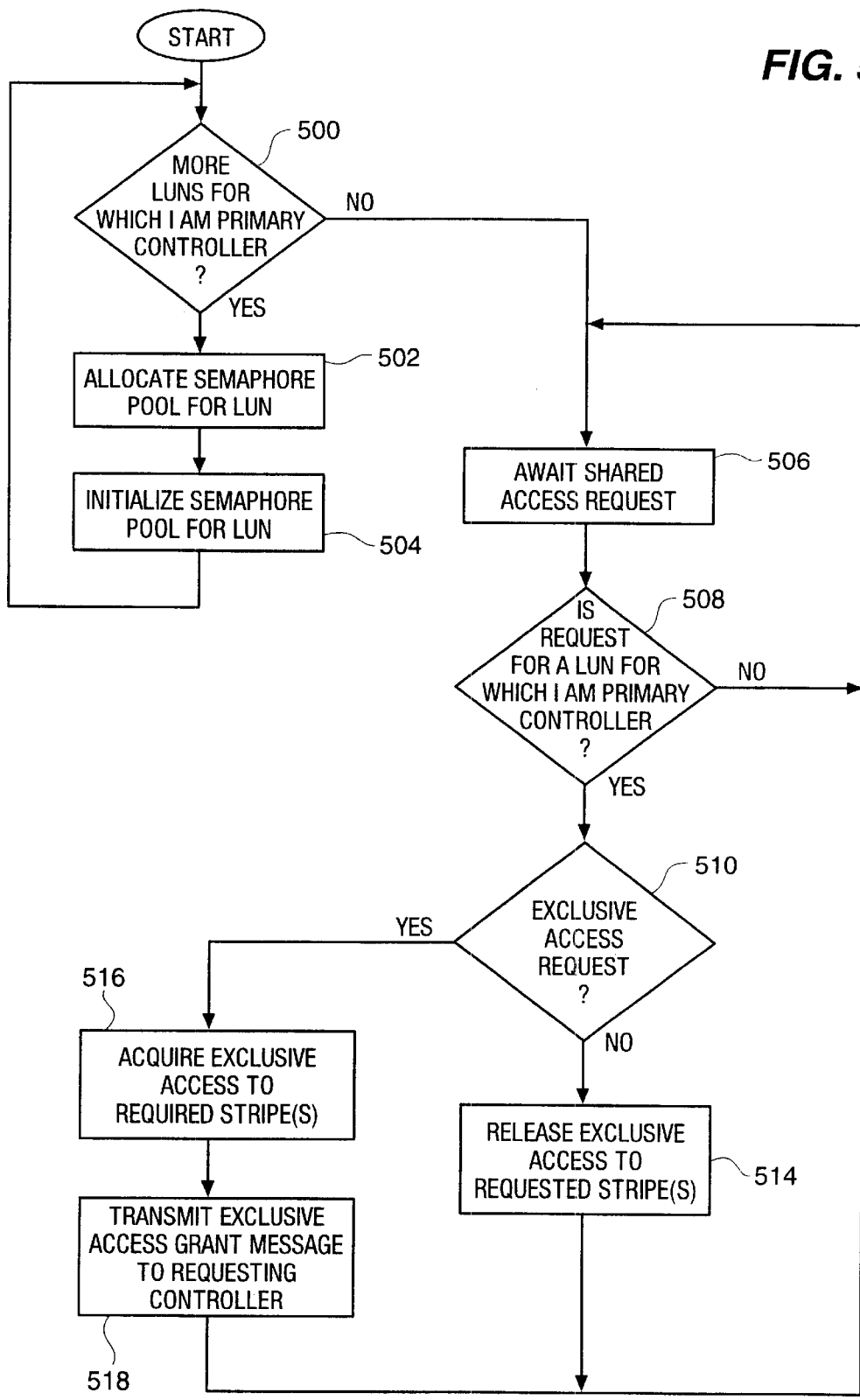
FIG. 5 is a flowchart describing the operation of the primary controller in managing exclusive access to one or more LUNs.
Figure 6:
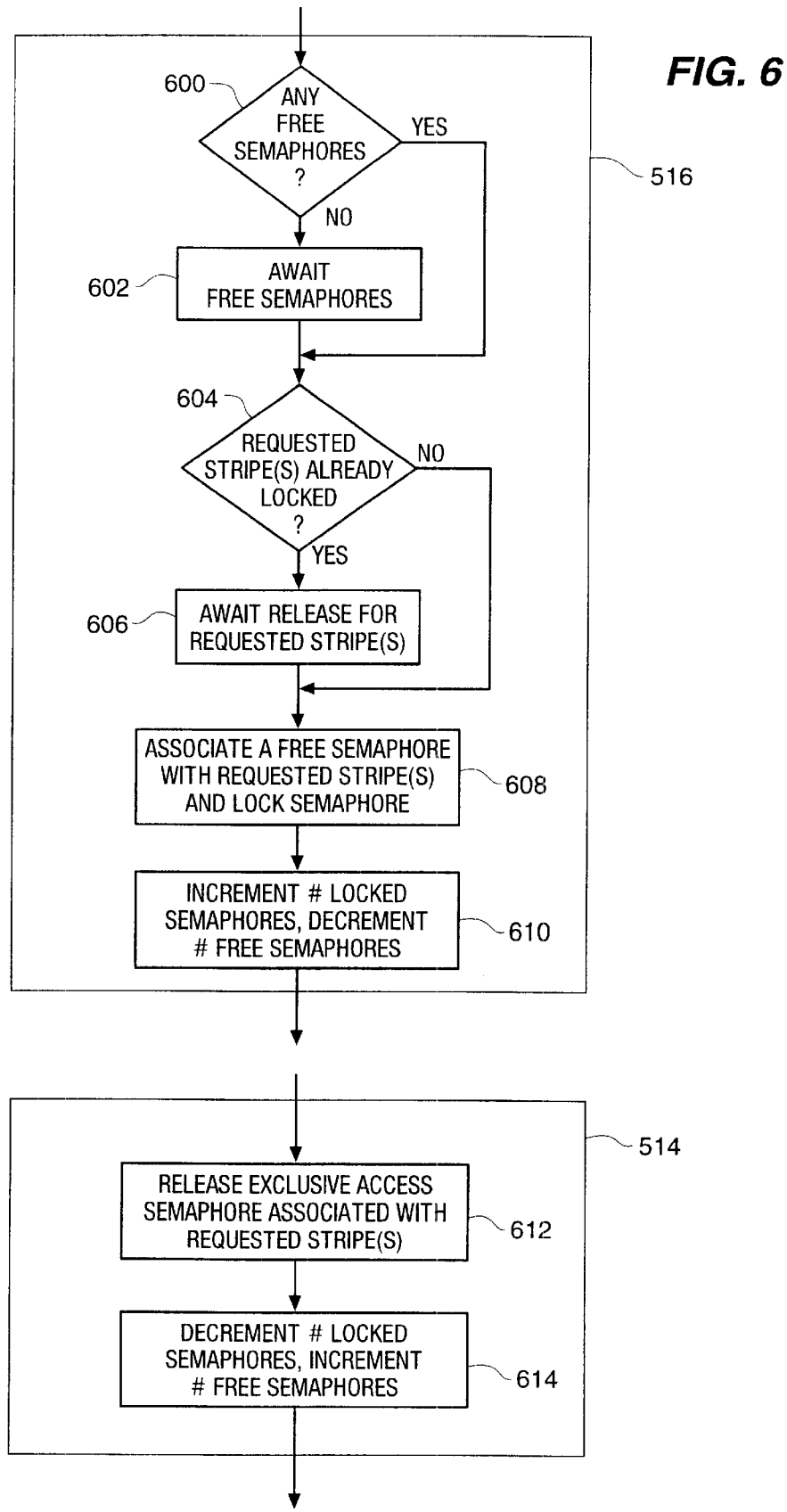
FIG. 6 contains two flowcharts providing additional details of the operation of steps of FIG. 5 which acquire and release exclusive access to particular stripes of particular LUNs.
Figure 7:
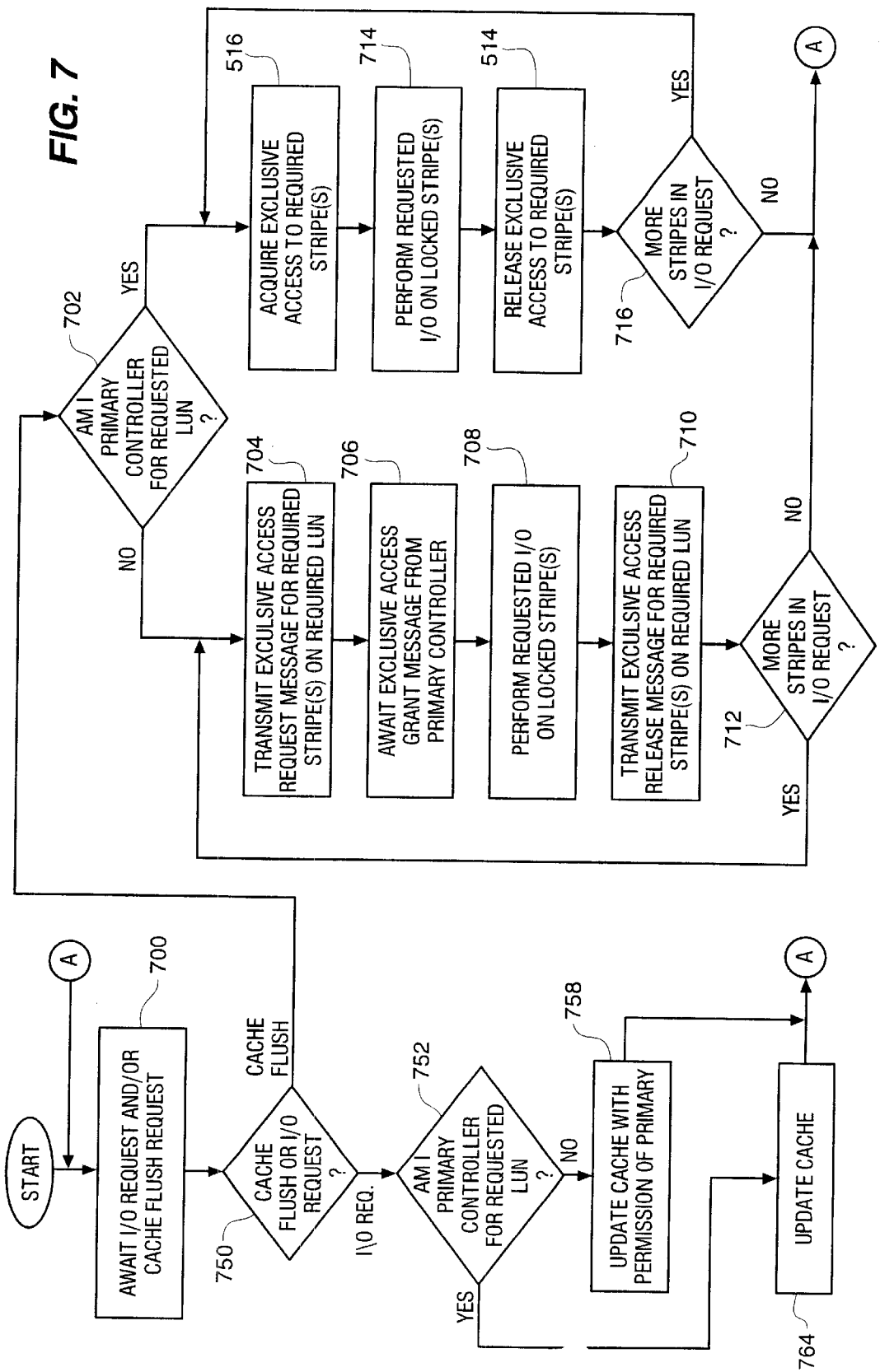
FIG. 7 is a flowchart describing the operation of a controller requesting temporary exclusive access to a stripe of a LUN for purposes of performing a requested I/O operation.

FIGS. 5–7 are flowcharts describing the methods of the present invention as operable in the RAID environments described above. FIG. 5 describes the methods of the present invention as operable on a primary control module to coordinate temporary exclusive access to one (or more) LUNs (disk arrays). FIG. 7 describes the operation of the methods of the present invention in any control module (primary or otherwise) which wishes to acquire temporary exclusive access to a portion of a disk array for purposes of performing a requested I/O operation. FIG. 6 describes detailed aspects of subfunctions common to the methods of FIGS. 5 and 7. It will be recognized by those of ordinary skill in the art that the flowcharts of FIGS. 5–7 describe only control methods relevant to the present invention. Such methods must be integrated with other well known aspects and methods of RAID control such as host communications and command interpretation as is well known to those of ordinary skill in the art.

The method of FIG. 5 is operable in a control module at initialization to prepare to manage temporary exclusive access on behalf of all LUNs for which it has been designated the primary control module. A control module may be designated as the primary control module with respect to a particular LUN by operator configuration or reconfiguration processes well known to those of ordinary skill in the art. Likewise, well known redundancy control techniques may reassign a control module to assume the role of primary controller when the present primary control module fails.

Elements 500–504 of FIG. 5 are operable to allocate space in memory 114.1 for, and initialize, a semaphore table 400 for each LUN for which the controller has been designated as the primary controller. Element 500 tests to determine whether more LUNs remain for which the controller has been designated as primary controller. If additional LUNs have yet to be so processed, processing continues with elements 502 and 504 to allocate and initialize another semaphore table 400 to associate with each such LUN. When no further LUNs remain for which the controller has been designated as primary, processing continue with element 506.

Elements 506–518 are iteratively operable to process access coordination messages exchanged among the plurality controllers requesting and releasing temporary exclusive access to a particular identified portion of a particular identified LUN. One of ordinary skill in the art will readily recognize that elements 506–518 may be skipped if the control module is not designated as primary with respect to any LUNs. Each controller in the plurality of controllers attached to the common shared LUN will perform the initialization steps 500–504 to determine whether it is designated as primary controller for any LUNs. All controllers which are designated as primary with respect to at least one LUN will then perform the following steps 506–518 to await and process requests to lock portions of the LUNs for which it is designated as primary. In addition, it will be recognized that well known redundancy and recovery techniques may be employed to reinitialize a control module to assume the role of primary controller in response to a failure of the configured primary controller. The following discussion proceeds focused on the operation of a single such control module. Others will be operating under control of the same methods in parallel with the operations described below for a single control module.

Element 506 is operable to await reception by the controller of a message from a controller which requests temporary exclusive access to a portion of an identified disk array (LUN). One of ordinary skill in the art will readily recognize that standard multi-tasking and/or multi-threading programming techniques may be employed to permit other processing to continue within the control module as this process described in FIG. 5 awaits reception of such a message. In essence, following the initialization steps of elements 500–504, elements 506–518 are operable as background or daemon processing within the control module.

When an exclusive access request message is received from a requesting controller, element 508 is operable to determine whether the request identifies a LUN (a disk array) for which this controller is designated as primary. Such requests may be transmitted from a requesting controller in a broadcast fashion or directed to a particular control module (node) commonly attached to the communication medium. The particular communication medium chosen will determine whether such message must be broadcast to all control modules or may be directed to a particular controller and therefore determine whether element 508 is required to sort out irrelevant broadcast requests. In particular, element 508 determines the relevance of the message by comparing the LUN identification received with the message to the identification field 402 of each semaphore table 400 allocated and initialized in the controller's memory 114.1.

In the best presently known mode of implementing the present invention, the designation of controllers as primary or secondary with respect to a particular LUN is known to all controllers through configuration information provided at subsystem initialization. Information regarding reconfiguration of the designations of primary and secondary controllers is also available to all controllers of the subsystem. Therefore, a secondary controller will know which specific controller is designated as the primary controller with respect to any particular LUN. Messages from the secondary controller requesting temporary exclusive access to a LUN are therefore directed over the communication medium to the specific controller which has been designated as primary with respect to the particular LUN. Messages directed from the primary controller to a requesting secondary controller are likewise addressed to the specific secondary controller which requested the temporary exclusive access.

One of ordinary skill in the art will readily recognize that the means for uniquely addressing a particular controller are specific to each controller communication medium. In addition, for certain communication media which may lack the ability to specifically address each controller, a broadcast technique may be utilized for the exchange of messages between primary and secondary controllers. Each controller then is programmed to process broadcast messages which are relevant to its operation and ignore other broadcast messages.

If element 508 determines that the received request is directed to a LUN not managed by this controller, then the message is ignored by this controller and processing continues by looping back to element 506 to await further requests. When, as noted above, the controller communication medium permits specific addressing of messages to particular controllers, step 508 may be eliminated. A message received at a particular controller will always be addressed to that controller by operation of lower layers of the communication medium. Another controller which has been designated as primary will respond in due course to the request message ignored by this controller.

If element 508 determines that the received request message is directed to a LUN managed by this controller, the element 510 is next operable to determine whether the message is requesting or releasing temporary exclusive access to the LUN. If the message is requesting temporary exclusive access, processing continues with element 516. Otherwise, processing continues with element 514 to release temporary exclusive access previously requested and granted. Details of the operation of element 514 are discussed below with respect to FIG. 6. Following operation of element 514, processing continues by looping back to element 506 to await receipt of other messages.

If element 510 determines that the received message is requesting temporary exclusive access by another control module, then processing continues with element 516 and 518. Element 516 is operable to gain the requested exclusive access. Element 518 then transmits a message back to the requesting controller to indicate that the requested temporary exclusive access has been granted. Return of the grant message, as discussed below with respect to FIG. 7 permits the requesting controller to proceed with the required I/O operation secure with the knowledge that other controllers will be prevented from interfering with the required I/O operations. Processing then continues by looping back to element 506 to await other received messages.

One of ordinary skill in the art will readily recognize standard error check and recovery techniques for enhancing the message exchange protocol described above. For example, the primary controller may exchange other messages with controllers which presently have semaphores locked to retain temporary exclusive access. If these other messages indicate a failure in the processing of the other controller, the primary controller may force the release of the semaphore to prevent deadlock conditions. Such monitoring and recovery techniques and protocols are well known to those of ordinary skill in the art and are dependent upon the particular communication medium and protocols chosen to exchange messages between the plurality of controllers.

FIG. 6 provides additional detail regarding the operation of elements 516 and 514 of FIG. 5. In particular element 516 of FIG. 5 is further described as elements 600–610 of FIG. 6 and element 514 of FIG. 5 is further detailed as elements 612–614 of FIG. 6. Elements 600–610 describe the detailed operation of element 516 of FIG. 5 to allocate a free semaphore entry, associate the allocated semaphore with the identified lock request, and lock the allocated semaphore.

Element 600 is first operable to determine whether any free semaphores are presently available in the semaphore table 400 associated with the LUN identified by the lock request. If no free semaphore entries are presently available, element 602 is then operable to await availability of a free semaphore entry in the semaphore list 410 of the semaphore table 400. Once a semaphore list 410 entry is freed for use, processing continues with element 604. The count fields 406 and 408 of the semaphore table 400 may be used to determine the number of semaphore entries presently freed or locked. One of ordinary skill in the art will readily recognize a wide variety of data structures and programming constructs which may be employed to determine when a semaphore list 410 entry is available for re-use.

Further, as noted above, well known multi-tasking and multi-threading programming techniques may be employed to permit other processing within the control module to proceed as element 602 awaits availability of a free semaphore list 410 entry.

Element 604 is next operable to inspect the locked entries in the semaphore list 410 for the desired LUN to determine whether the particular portion identified in the present exclusive access request is already locked by processing of another I/O request (either by another control module or this controller). In particular, as noted above, when managing a RAID level 5 geometry, a controller may lock one or more stripes of the disk array for temporary exclusive access to permit the concurrent access to a common shared LUN. Element 604 therefore searches the entries in the semaphore list 410 of the semaphore table 400 to determine if any other semaphore is associated with a portion (a number of stripes) which overlaps any portion of the portion requested to be locked in the present temporary exclusive access request. If the portion to be locked does not overlap with any other presently locked portion, processing continues with element 608. Otherwise, element 606 is operable to await the release of the lock or locks which overlap the portion of the disk array to be locked by the present request. As noted above, several well known multi-tasking and multi-threading programming techniques may be employed to permit other processing to proceed within this controller as element 606 awaits release of the portion to be locked.

When the portion of the disk array to be locked is free for such a lock, elements 608 and 610 are operable to assert the request lock for temporary exclusive access. In particular, element 608 associates the free semaphore entry obtained by elements 600 and 602 with the particular portion of the disk array requested to be locked. As noted above, the semaphore list entries include information used to associate the semaphore with the particular portion of the disk array locked thereby. Element 608 is therefore operable to record such identification information in the allocated semaphore list entry. Element 610 is then operable to increment the counter field 408 indicating the number of semaphore presently locked and to decrement the counter field 406 indicating the number of semaphore entries presently free for re-use.

Elements 612–614 describe the detailed operation of element 514 of FIG. 5 to release a previously requested lock over a portion of the common disk array. When a controller has completed its requested I/O operation following request (and grant) of temporary exclusive access, it releases the lock to permit other controllers to use that portion of the common disk array.

Element 612 is first operable to release the locked semaphore entry in the semaphore list 410 of the semaphore table 400 corresponding to the identified LUN. Element 614 then increments the counter field 406 of the semaphore table 400 which indicates the number of free semaphore list 410 entries. Further, element 614 decrements the counter field 408 indicative of the number of semaphore list 400 entries presently locked.

Well known multiprocessing techniques and interprocess communication and signaling programming techniques may be employed to resume other processing (as noted above) which was suspended awaiting either a freed semaphore list 400 entry or awaiting release of a locked portion overlapping with a requested lock portion. Further, well known list processing techniques to speed the search for specific semaphore entries in semaphore list 410 are useful to enhance the performance of the methods of the present invention. Such rapid search methods improve the performance of the present invention by reducing the time and processing overhead to locate overlapping locked portion of the disk array as described above with respect to element 604 or to locate a locked semaphore to be released as discussed above with respect to element 612.

As noted above, the portion of the common disk array to be locked may, preferably, be one or more stripes of a RAID level 5 subsystem. However, one of ordinary skill in the art will readily recognize that the methods expressed herein may be easily extended to apply to any quantum unit of the common shared LUN to be managed.

FIG. 7 is a flowchart describing the operation of the methods of the present invention in a control module requiring temporary exclusive access to a LUN to perform a required I/O operation. Each of the plurality of control modules in the RAID subsystem, including the primary control module for any particular LUN, operate in accordance with the method of FIG. 7 to assure cooperation between all controllers connected to a common shared LUN. The method depicted n FIG. 7 may often be referred to as a client process or client task (or simply client) while the requests generated thereby are serviced by a server process (or server task or simply server) operable in accordance with the method of FIG. 5 described above. The client processes request and release temporary exclusive access from the primary controller via access coordination messages transmitted therebetween as noted above. Also as noted above, such messages are transmitted between the plurality of control modules in any of several well known communication media and topologies.

The primary control module associated with a particular common shared LUN acts as a server in coordinating the cooperative access to the common shared LUN. However, the primary control module may also, simultaneously, act as a client to process I/O requests directed to its common shared LUN. Its activities in processing I/O requests must also be coordinated with the activities of the other control modules with respect to the common shared LUN. The method of FIG. 7 therefore is operable on all control modules of the RAID subsystem which share access to at least one common shared LUN.

Elements 700–764 of FIG. 7 are iteratively operable within each control module to process I/O requests to a particular LUN of the RAID subsystem. When operable on the primary controller, temporary exclusive access is obtained and released by direct function calls to the relevant functions within the primary controller. When operable on other than the primary control module, temporary exclusive is requested, granted, and released via messages exchanged with the primary controller.

Specifically, element 700 awaits the receipt of an I/O request or cache flush request directed to a LUN within the RAID subsystem. Such requests may be host generated or generated locally within the plurality of controllers. As noted above, well known multi-tasking and multi-threaded programming techniques may be employed within a RAID controller to permit other processing to continue while element 700 is operable to await receipt of a new I/O request. In a write-back cache configuration of the storage subsystem, it is common that I/O requests are processed by appropriate manipulation of the cache memories within the controllers of the storage subsystem. Other requests, cache flush requests, eventually request flushing the cache memories to the disk drives of the disk array to synchronize the disk array with the information stored collectively in the cache memories of the subsystem.

One of ordinary skill in the art will readily recognize that I/O requests and cache flush requests may be essentially one and the same when the storage subsystem is operating in a write-through configuration. Similarly, certain specific command sequences associated with the communication protocols and medium used to connect the controllers and the disk drives may operate similar to cache write-through regardless of the subsystem configuration. Such requests, wherein the I/O request and associated cache flush operations are combined as one, are represented in FIG. 7 as two separate operations. Specific modifications of the methods represented by FIG. 7 appropriate to the particular storage subsystem configuration will be apparent to those of ordinary skill in the art.

Following receipt of an I/O or cache flush request by operation of element 700, element 750 is operable to determine whether the received request is for an I/O operation or a cache flush operation (or as noted above a combination of the two represented in FIG. 7 as two sequential operations). If the received request is for an I/O operation, elements 752–764 are next operable to process the I/O request with appropriate manipulation of the cache memories or storage devices of the storage subsystem. If element 750 determines that the received request is for a cache flush operation, elements 702–616 are next operable to process the cache flush request.

To process a cache flush request, element 702 is first operable to determine whether this control module is the primary controller for the LUN associated with the cache flush request. If not, processing continues with elements 704–712 to process the cache flush request as a client exchanging messages with the server task operating on the designated primary controller. In particular, element 704 is operable to transmit a message to the primary controller requesting temporary exclusive access to a first required portion of the LUN associated with the cache flush request.

Element 706 is next operable to await receipt of a message from the primary controller which grants the requested temporary exclusive access to the identified LUN. Again, as noted above, well known multi-tasking and multi-threaded programming techniques may be employed to permit other processing to proceed on this controller as the method of FIG. 7 awaits the receipt of a message from the primary controller.

Once the grant message is received from the primary controller by operation of element 706, element 708 is next operable to perform the first portion of the requested operation on the LUN associated therewith. Having requested, and been granted, temporary exclusive access to the LUN, element 708 may perform the requisite cache flush operations without interference from others of the plurality of control modules.

A cache flush request (or I/O request) may identify a plurality of related portions (stripes) to be involved in the requested operation. The processing of elements 704–712 are therefore operable on related (e.g., contiguous) portions of such a plurality of stripes. Once the first portion of the requested cache flush operation is completed by element 708, element 710 is operable to transmit a message to the primary controller to release the temporary exclusive access to the identified LUN. This frees the LUN for operations by others of the plurality of RAID controllers sharing access to the common shared LUN. Lastly, element 712 determines whether additional portions remain to be processed in the original cache flush request received from a host computer. If additional portions remain, processing continues by looping back to element 704 to process additional portions of the cache flush request. For example, each portion may represent a single RAID level 5 stripe or a group of contiguous stripes. As noted above, a portion may be any quantum unit of data applicable to the particular RAID control methods employed within the RAID subsystem and identifiable with a particular semaphore in the semaphore table 400. If no further portions remain in the I/O request, processing continues by looping back to element 700 to await another host computer I/O or cache flush request.

If element 702 above determines that this controller is designated the primary controller for the LUN identified with the cache flush request, then processing continues with elements 516, 714, 514, and 716 to process the request within this controller, the primary controller, without the need for exchange of messages. One of ordinary skill in the art will readily recognize that the primary control module may process requests as a client in the same manner discussed above with respect to elements 704–712. Messages may be transmitted, received and processed all within the primary controller. The best presently known preferred mode of implementing the present invention avoids the unnecessary generation and transmission of such messages between control modules when the primary controller is also the client. Rather, as shown in FIG. 7, the client processing may be integrated with the corresponding service functions within the primary controller to reduce processing and inter-controller communication overhead.

Element 516 is next operable as the function described above with respect to FIG. 6 to acquire temporary exclusive access to the first portion of the LUN associated with the cache flush request. Once such exclusive access is acquired, element 714 is next operable to perform the first portion of the requested cache flush operation on the LUN associated therewith. Having acquired temporary exclusive access to the LUN, element 714 may perform the requisite operations without interference from others of the plurality of control modules.

Once the first portion of the requested cache flush operation is completed by element 714, element 514 is operable as the function described above with respect to FIG. 6 to release the temporary exclusive access to the identified LUN. This frees the LUN for operations by others of the plurality of RAID controllers sharing access to the common shared LUN. Lastly, element 716 determines whether additional portions remain to be processed in the original cache flush request received from a host computer. If additional portions remain, processing continues by looping back to element 516 to process additional portions of the cache flush request. For example, each portion may represent single RAID level 5 stripe or a group of contiguous stripes. As noted above, a portion may be any quantum unit of data applicable to the particular RAID control methods employed within the RAID subsystem and identifiable with a particular semaphore in the semaphore table 400. If no further portions remain in the present cache flush request, processing continues by looping back to element 700 to await another host computer I/O or cache flush request.

If element 750 determined that the received request is for an I/O operation (e.g., an operation generally satisfied by manipulation of the cache memory), then elements 752, 758, and 764 are next operable to process the received I/O request. Specifically, elements 752, like element 702 above, determines whether the present controller is the primary controller for the LUN associated with the received I/O request. If so, element 758 is operable to update the cache memories distributed among the plurality of controllers. Otherwise, element 764 is operable to update the cache memories distributed among the plurality of controllers with coordinated permission of the primary controller. Detailed operation of elements 758 and 764 are presented below with respect to FIGS. 8 and 9, respectively.

Cache Coherency Messages and Methods

Elements 758 and 764 are described above as performing the required cache processing for an identified portion of the identified LUN of the I/O request. In so far as multiple control modules are manipulating a common shared LUN, it is apparent that the plurality of cache modules (e.g., 116.1 and 116.2 of FIG. 1) must be maintained in a coherent state. One control module which knows of updated information associated with a locked portion of a particular LUN must be certain that all other control modules are aware of such updated information.

Elements 758 and 764 therefore include all processing necessary to maintain such consistent state data between all control modules attached to a common shared LUN. In particular, as part of the processing of the I/O operations within elements 758 and 764, cache data and cache metadata messages are generated and transmitted to the other control modules attached to the LUN. As noted above with respect to access coordination messages exchanged for temporary exclusive access, cache coherency messages are exchanged among the controllers to maintain cache coherency within all controllers with respect to the shared storage areas. The transmission of cache coherency messages may be broadcast or specifically addressed to appropriate control modules as is required by the particular communication medium connecting the control modules.

In the best presently known mode for implementing the invention, the secondary controller will request permission of the primary controller to update its local cache on behalf of an I/O request for a particular LUN. The primary controller thereby maintains relevant mapping information (cache meta-data) identifying the contents of cache memory within each controller having shared access to the associated LUN. In response to the secondary controller's request, the primary controller will transmit messages with any other controllers having cache data stored locally which is invalidated by the requested update of the cache. When all invalidated caches have been updated to discard their now invalid cache data, the primary controller returns a grant of the requested permission to the requesting secondary controller. The secondary controller then completes the processing relating to the cached I/O request.

In this manner, the primary controller manages a cache for its associated LUN which is distributed across a plurality of controllers sharing access to the LUN. The primary controller is therefore also referred to herein as a distributed cache manager (DCM). The DCM (primary controller) for each LUN therefore manages the decentralized cache through an exchange of messages among the controllers sharing access to the LUN.

Figure 8:
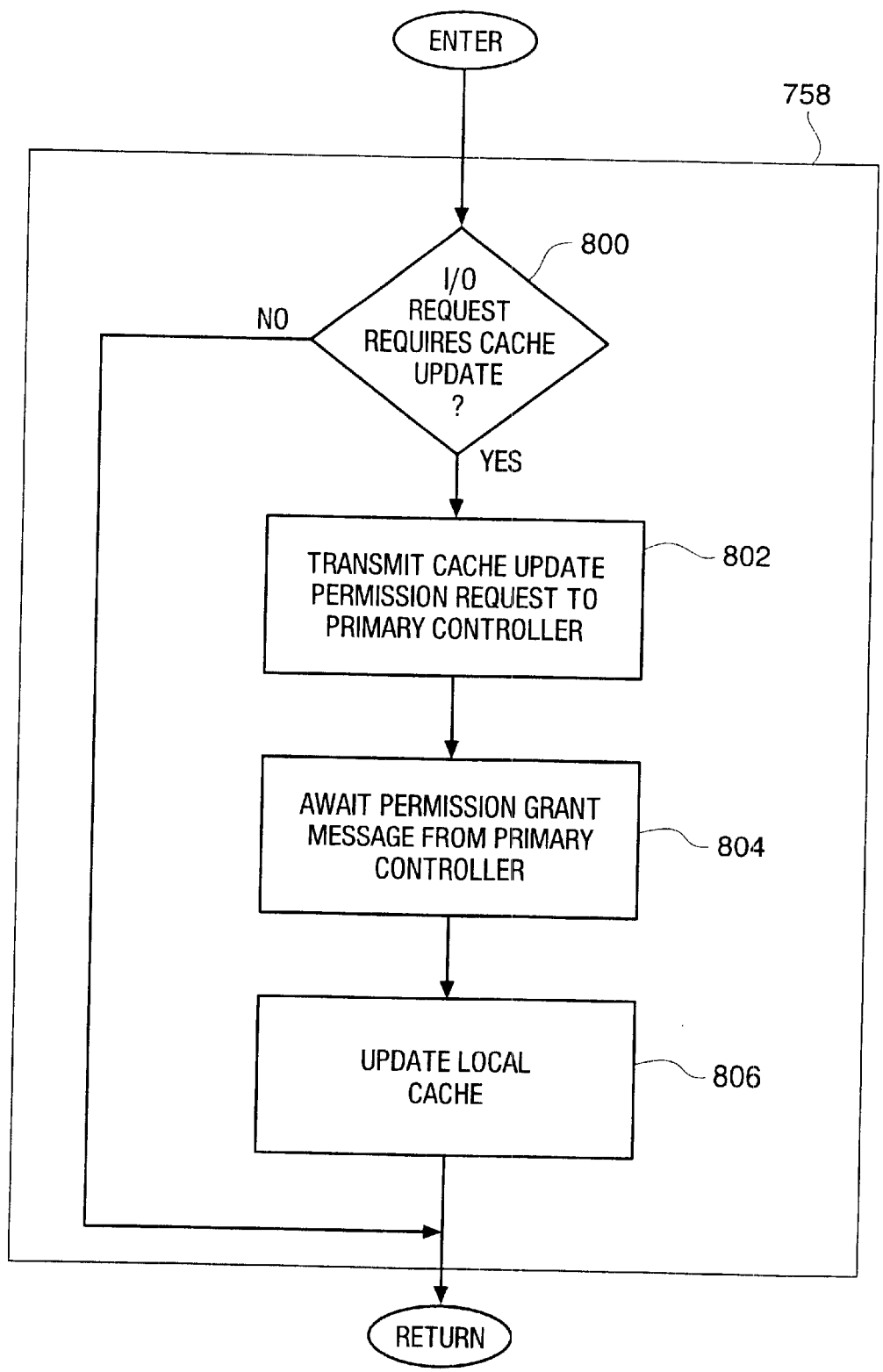
FIG. 8 is a flowchart providing additional details for elements of FIG. 7.
Figure 9:
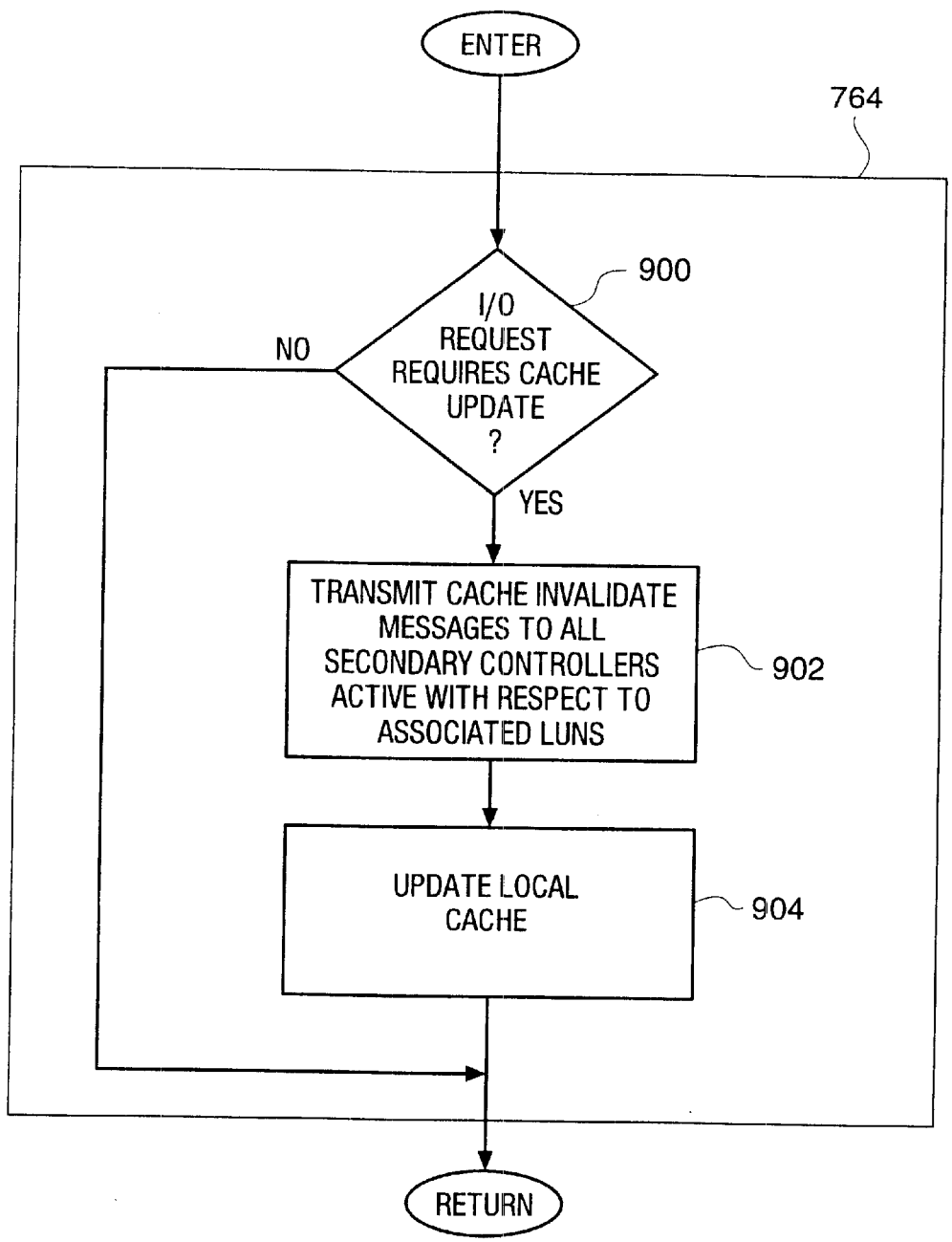
FIG. 9 is a flowchart providing additional details for elements of FIG. 7.

FIGS. 8 and 9 are flowcharts providing additional detail of the operation of elements 758 and 764, respectively, as they relate to cache data and cache metadata management. In particular, FIG. 8 is a flowchart describing additional details of the operation of element 758 to perform a requested I/O operation on a secondary controller with respect to the selected LUN. Element 800 of FIG. 8 is first operable to determine whether the I/O request in process requires a cache update. If not, processing of element 758 is complete (with respect to distributed cache management) and processing returns to that of FIG. 7. Otherwise, element 802 is next operable to generate and transmit a cache update permission request message to the primary controller associated with the I/O request's identified LUN. The update permission request message includes an identification of the logical storage locations for which the cache memory is to be updated. As above, such a message is preferably addressed to the primary controller as indicated by present configuration data of the RAID subsystem. Alternatively, such a message may be broadcast to all controllers attached to the common LUN. Each controller then determines the relevance of a received broadcast message to its operations and processes it accordingly.

Element 804 is next operable to await receipt of a message from the primary controller of the LUN granting permission to update the local cache of the secondary controller processing the I/O request. When the primary controller (the DCM) has invalidated all other copies of the identified cache storage spread throughout the plurality of controllers sharing the LUN, then it will generate and transmit a message indicating that the requested permission is granted. The secondary controller then proceeds with element 806 to update the local cache memory in accordance with the I/O request.

FIG. 9 is a flowchart providing additional details of the operation of element 764 of FIG. 7 to perform a requested I/O operation on the primary controller with respect to the selected LUN. Element 900 of FIG. 9 is first operable to determine whether the I/O request in process requires a cache update. If not, processing of element 764 is complete (with respect to distributed cache management) and processing returns to that of FIG. 7. Otherwise, element 902 is next operable to generate and transmit a cache invalidate message to each secondary controller which has cache memory contents invalidated by the cache update of the I/O request in process by the primary controller. The primary controller, in its role as distributed cache manager (DCM), maintains mapping information based upon the update permission messages received as discussed above from each secondary controller sharing access to the associated LUN. The primary controller may therefore transmit cache invalidate messages only to those secondary controllers which are known to have obsolete cache content based upon the cache update in process. Though the preferred embodiment would inspect such mapping information to selectively transmit invalidate messages, an alternative embodiment would simply transmit such messages, identifying the cache portions to be invalidated, to each and every secondary controller sharing access to the associated LUN. As above, such a message is preferably addressed to the selected secondary controllers as indicated by present configuration data of the RAID subsystem. Alternatively, such a message may be broadcast to all controllers attached to the common LUN. Each controller then determines the relevance of a received broadcast message to its operations and processes it accordingly. The primary controller then proceeds with element 904 to update the local cache memory in accordance with the I/O request.

Figure 10:
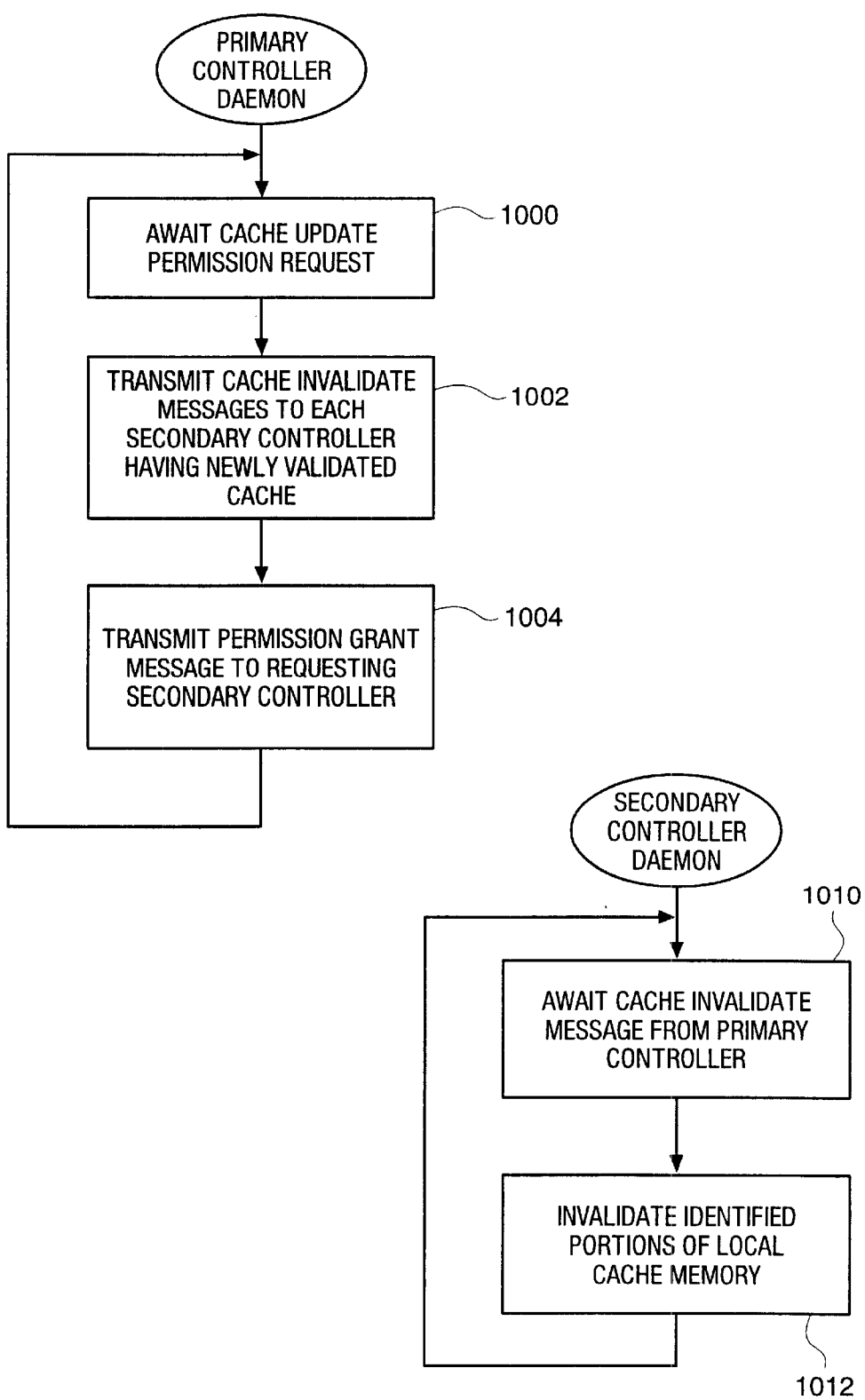
FIG. 10 is flowcharts describing background daemon processing in both primary and secondary controllers for maintaining distributed cache coherency.

The primary controller may receive a cache update permission message from a secondary controller at any time, asynchronously with respect to its mainline processing of I/O requests. In like manner, each secondary controller may receive a cache invalidate message from a primary controller at any time, asynchronously with respect to its mainline processing of I/O requests. Daemon (background) processing within each controller enables asynchronous processing of such messages. The flowcharts of FIG. 10 depict the background (daemon) processing within both the primary and secondary controllers. Elements 1000–1004 are descriptive of the daemon processing within the primary controller to process cache update permission messages while elements 1010–1012 are descriptive of daemon processing within the secondary controllers to process cache invalidate messages. Element 1000 is first operable to await receipt within a primary controller of a cache update permission request message from a secondary controller sharing access to the associated LUN. Element 1002 then generates and transmits cache invalidate messages for the identified portions of the cache to each secondary controller which would need to invalidate its local cache due to the pending update., Element 1004 then transmits a grant permission message to the requesting secondary controller to permit it to complete its cache update and I/O request processing. Processing of the background daemon then continues by looping back to element 100 to await receipt of another cache update permission request message.

Element 1010 of FIG. 10 is operable in the background (daemon) processing of each secondary controller to await receipt of a cache invalidate message from the primary controller of an associated shared LUN. Element 1012 is then operable to invalidate the secondary controller's local cache in accordance with the identified portions in the received invalidate message. Background (daemon) processing within the secondary controller then continues by looping back to element 1010 to await receipt of another cache invalidate message from a primary controller.

The particular format and content of cache data and cache meta-data messages may vary depending upon the particular cache configuration of the plurality of control modules.

Scalability

A RAID storage subsystem operable in accordance with the present invention is easily scaled for particular performance goals as well as for redundancy. Control modules may be added to provide additional parallel computing capability for processing host generated I/O requests. The additional controllers, as noted above, may be configured as secondary controller s with respect to particular LUNs of the subsystem to simultaneously process additional host I/O requests. The additional secondary controllers may also provide enhanced redundancy in case of failure of another controller.

Each controller may access a plurality of LUNs in the storage array. The first of such LUNs accessed by each controller is given preference in performance aspects as compared to all other LUNs serviced by a controller. The controller is typically the primary controller with respect to the LUN for which it offers preferred performance in that it coordinates the required semaphore locking and distributed cache management aspects of shared access to the LUN.

Other LUNs to which the controller has access are provided less than preferred access. The controller therefore typically performs in the role of a secondary controller with respect to any non-preferred access LUNs to which it has access. As noted above, the secondary controller with respect to a LUN exchanges messages with the primary controller associated with the LUN to request, grant, and release temporary exclusive access and to maintain cache meta-data within the primary controller for purposes of managing the distributed cache memory.

Figure 11:
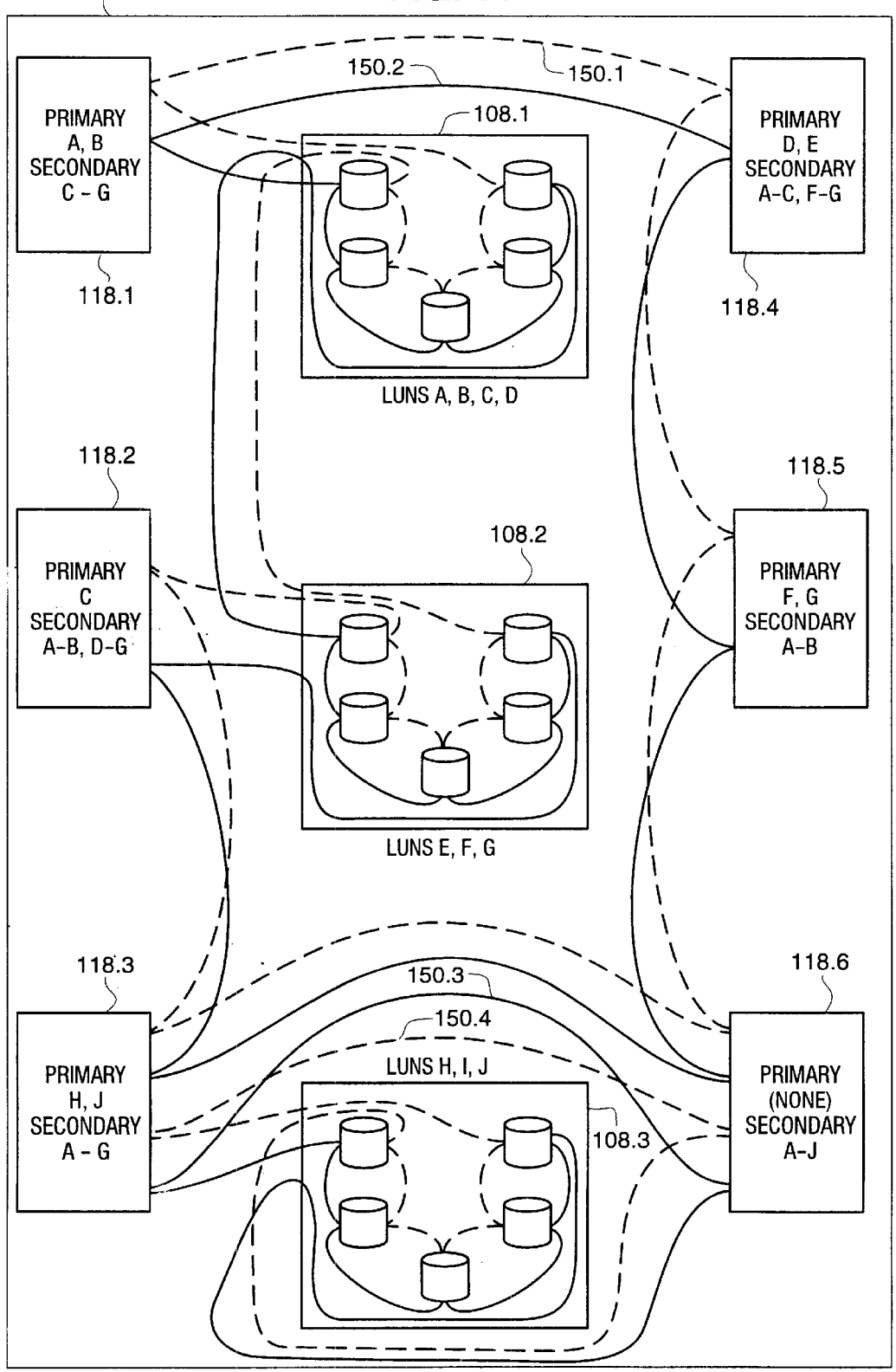
FIG. 11 is a block diagram depicting another preferred embodiment of RAID controllers operable in accordance with the methods of the present invention in which the plurality of controllers communicate via one or more multi-point loop media connecting controllers and disk drives.

FIG. 11 is a block diagram of a RAID storage subsystem 1100 comprised of six controllers, 118.1–118.6, connected to a plurality of disk arrays (LUNs) 108.1–108.3, via a plurality of multi-point loop media 150.1–150.4. Each controller 118.1–118.6 is connected to one or more of the disk arrays 108.1–108.3. In particular, controllers 118.1, 118.2, 118.4, and 118.5 are connected via both loops 150.1 and 150.2 to disk arrays 108.1 and 108.2 to provide enhanced redundancy and improved performance through parallel processing capabilities.

Each disk array includes one or more LUNs for the storage of data. One of ordinary skill in the art will readily recognize that a single LUN may be distributed across not only multiple disks of an array, but also across multiple arrays. Disk array 108.1 is shown, for example to include LUNs A–D, disk array 108.2 includes LUNs EG, and disk array 108.3 includes LUNs H–J. There is a primary controller associated with each LUN (A–J). Specifically, for example as shown in FIG. 11, Controller 118.1 is primary controller with respect to LUNs A and B and is a secondary controller with respect to all others to which it is attached C–G. Controller 118.2 is primary with respect to LUN C and is a secondary controller with respect to all other LUNs to which it is attached A–B and D–G. Controller 118.3 is primary with respect to LUNs H–J and is a secondary controller with respect to all other LUNs to which it is attached A–G. Controller 118.4 is primary with respect to LUNs D and E and is a secondary controller with respect to all other LUNs to which it is attached A–C and F–G. Controller 118.5 is primary with respect to LUNs F and G and is a secondary controller with respect to all other LUNs to which it is attached A–E. Controller 118.6 is primary with respect to no LUNs and is a secondary controller with respect to all other LUNs to which it is attached A–J. One of ordinary skill in the art will readily recognize that FIG. 11 is intended only as exemplary of one possible configuration of a RAID storage subsystem operable in accordance with the methods and associated apparatus of the present invention. Many other similar configurations will be readily apparent to those of ordinary skill in the art.

The storage capacity of the RAID subsystem 1100 of FIG. 11 may be readily enhanced by the addition of disk array devices to the redundant control and communication configuration. Similarly, the performance of RAID subsystem 1100 of FIG. 11 may be scaled by adding or removing secondary controllers providing parallel processing capability for LUNs. For example, all six controllers 118.1–118.6 may process I/O requests for any of LUNs A–G. This number could be reduced by removing one or more controllers and reassigning a primary controller for any LUNs for which the removed controller served as primary. For example, controller 118.6 of FIG. 11 could be removed from the RAID subsystem 1100. Or for example, more controllers could be added to the subsystem of FIG. 11 and configured to operate as additional secondary controllers with respect to one or more LUNs thereby increasing the parallel processing capability of the subsystem 1100.

Adding controllers to RAID subsystem 1100 of FIG. 11 further enhances reliability through improved redundancy. Controllers 118.3 and 118.6 may operate as a redundant pair of controllers servicing requests directed to LUNs H–J on disk array 108.3 via redundant communication loops 150.3 and 150.4. Any of controllers 118.1–118.6 may operate as redundant controllers for servicing requests directed to LUNs A–G on disk arrays 108.1 or 108.2 via redundant communication loops 150-1 and 150.2.

FIG. 11 is therefore a graphical depiction of the scalability enabled by the methods and associated apparatus of the present invention. Any number of controllers may be connected to any number of disk arrays via any number of communication paths using any of several communication buses and protocols. The methods and associated apparatus of the present invention enable coordinated processing of the shared access to a particular LUN by any such number of controllers and communication paths.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A RAID storage system comprising:
    a plurality of disk drives forming a common shared LUN;
    a communication medium; and
    a plurality of RAID storage control modules connected to said common shared LUN including:
    a primary RAID storage control module coupled to said disk drives and coupled to said communication medium; and a
    a plurality of secondary RAID storage control modules coupled to said disk drives and coupled to said communication medium,
    wherein access control messages are exchanged between said primary RAID storage control module and said plurality of secondary RAID)storage control modules via said communication medium to coordinate temporary exclusive access by one of said plurality of storage RAID control modules to identified stripes within said plurality of disk drives.

2. The system of claim 1 wherein each of said plurality of secondary RAID storage control modules includes:
    a request generator to generate an exclusive access request message;
    a request transmitter coupled to said request generator to transmit said exclusive access request message to said primary RAID storage control module; and
    a secondary RAID storage control module access coordinator coupled to said request transmitter to await receipt by said secondary RAID storage control module of an exclusive access grant message from said primary RAID storage control module granting exclusive access to said identified stripes.

3. The system of claim 2 wherein said primary RAID storage control module includes:
    a request receiver to receive said exclusive access request message;
    a primary RAID storage control module access coordinator coupled to said request receiver to await availability of exclusive access to said identified stripes in response to receipt of said exclusive access request message;
    a response generator coupled to said access coordinator to generate said exclusive access grant message in response to availability of exclusive access to said identified stripes; and
    a grant transmitter to transmit said exclusive access grant message to said plurality of secondary RAID storage control modules.

4. The system of claim 3 wherein said primary RAID storage control module access coordinator includes:
    a plurality of semaphores;
    a semaphore tester to determine that none of said plurality of semaphores is associated with said identified stripes;
    a semaphore association directory for associating one semaphore of said plurality of semaphores with said identified stripes in response to the determination that none of said plurality of semaphores is associated with said identified stripes; and
    a semaphore locker to lock said one semaphore associated with said identified stripes.

5. The system of claim 4 wherein said secondary RAID storage control module access coordinator further includes:
    a release generator to generate an exclusive access release message; and
    a release transmitter to transmit said exclusive access release message to said primary RAID storage control module.

6. The system of claim 5 wherein said primary RAID storage control module access coordinator further includes:
    a release receiver to receive said exclusive access release message wherein said release message includes indicia of the locked semaphore associated with said identified stripes;
    a semaphore locator to locate the locked semaphore in said semaphore association directory; and
    a semaphore unlocker to unlock the locked semaphore to thereby releasing exclusive access to said identified stripes in response to receipt of said exclusive access release message.

7. A RAID storage system comprising:
    a set of storage devices forming a commonly shared LUN;
    a plurality of RAID storage control modules commonly coupled to said commonly shared LUN wherein one of said plurality of RAID storage control modules is designated as a primary RAID storage control module, wherein said plurality of RAID storage control modules includes at least three RAID storage controllers;
    means, within said plurality of RAID storage control modules, for receiving a plurality of I/O requests from attached host computer systems; and
    means for processing each of said plurality of I/O requests substantially in parallel within distinct RAID storage control modules of said plurality of RAID storage control modules wherein said means for processing includes means for exchanging exclusive access messages between said primary RAID storage control module and others of said plurality of RAID storage control modules.

8. The system of claim 7 wherein said means for processing further includes:

means for coordinating temporary exclusive access to said common shared set of storage devices by said distinct control modules.

9. The system of claim 8:

wherein said exclusive access messages include exclusive access request messages directed from said others of said plurality of RAID storage control modules to said primary RAID storage control module, wherein said exclusive access messages include exclusive access grant messages directed from said primary RAID storage control module to said others of said plurality of RAID storage control modules, and wherein said exclusive access messages include exclusive access release messages directed from said others of said plurality of RAID storage control modules to said primary RAID storage control module.

10. A RAID storage controller attachable to a commonly shared LUN of a plurality of disk drives in a RAID storage subsystem, said storage controller comprising:

means for receiving I/O requests from host systems coupled to said RAID storage controller;

means, responsive to receipt of an I/O request, for coordinating access to portions of said plurality of disk drives by said storage controller with access to said plurality of disk drives by other RAID storage controllers to assure temporary mutual exclusivity between said RAID storage controller and said other RAID storage controllers;

inter-controller communication interface means for coupling said RAID storage controller to said other RAID storage controllers, wherein one of said other RAID storage controllers is designated as a primary RAID storage controller and wherein the means for coordinating includes:

means for exchanging exclusive access messages via said inter-controller communication interface means between said RAID storage controller and said primary RAID storage controller to assure temporary mutually exclusive access to said portions of said plurality of disk drives by said RAID storage controller.

11. The system of claim 10:

wherein said exclusive access messages include exclusive access request messages directed from said RAID storage controller to said primary RAID storage controller, wherein said exclusive access messages include exclusive access grant messages directed from said primary RAID storage controller to said RAID storage controller, and wherein said exclusive access messages include exclusive access release messages directed from said RAID storage controller and said other RAID storage controllers to said primary RAID storage control module.

* * * * *